(12) United States Patent
Chavali

(10) Patent No.: US 8,848,834 B2
(45) Date of Patent: Sep. 30, 2014

(54) SYSTEM AND METHOD FOR DETECTING A FRAME FORMAT

(75) Inventor: Nanda Kishore Chavali, Hyderabad (IN)

(73) Assignee: Uurmi Systems Pvt. Ltd (IN)

( * ) Notice: Subject to any disclaimer, the term of this patent is extended or adjusted under 35 U.S.C. 154(b) by 549 days.

(21) Appl. No.: 13/241,928

(22) Filed: Sep. 23, 2011

(65) Prior Publication Data

US 2013/0077718 A1   Mar. 28, 2013

(51) Int. Cl.
*H04L 27/22* (2006.01)
*H03D 3/00* (2006.01)
*H03D 3/02* (2006.01)
*H04L 23/00* (2006.01)
*H04L 5/00* (2006.01)
*H04L 27/26* (2006.01)
*H04L 27/00* (2006.01)

(52) U.S. Cl.
CPC ............ *H04L 5/0007* (2013.01); *H04L 5/0048* (2013.01); *H04L 27/2602* (2013.01); *H04L 27/0012* (2013.01); *H04L 5/0023* (2013.01)
USPC ............ 375/316; 375/329; 375/332; 375/377

(58) Field of Classification Search
CPC  H04B 7/18582; H04L 1/0006; H04L 1/0009; H04L 5/0048; H04L 27/06; H04L 27/0012; H04L 1/0046; H04L 27/2602; H04L 5/0023; H04L 5/0046; Y02B 60/31
USPC ......... 375/260, 261, 316, 340, 377, 279, 280, 375/329, 332; 370/203, 208; 329/304, 305
See application file for complete search history.

(56) References Cited

U.S. PATENT DOCUMENTS

| | | | | |
|---|---|---|---|---|
| 8,509,329 | B2 * | 8/2013 | Kwon et al. | 375/260 |
| 2011/0110443 | A1 * | 5/2011 | Kwon et al. | 375/260 |
| 2011/0149927 | A1 * | 6/2011 | Stacey et al. | 370/338 |
| 2011/0255620 | A1 * | 10/2011 | Jones et al. | 375/260 |
| 2012/0177144 | A1 * | 7/2012 | Lee et al. | 375/308 |

FOREIGN PATENT DOCUMENTS

EP   2320614 A2 *   5/2011

\* cited by examiner

*Primary Examiner* — Tesfaldet Bocure
(74) *Attorney, Agent, or Firm* — Benjamin A. Balser; Balser & Grell IP Law

(57) ABSTRACT

A method for detecting a format of a frame in a communication system is presented. An embodiment of the method includes receiving the frame comprising a plurality of orthogonal frequency division multiplexing (OFDM) symbols. The plurality of OFDM symbols may include at least one signal field symbol. The method further includes determining a modulation associated with the at least one signal field symbol. The modulation may be a first modulation or a second modulation. Also, the method includes estimating a position of the at least one signal field symbol among the plurality of symbols, and extracting a coding rate of the received frame. The method then includes detecting the format of the received frame based on the determined modulation and the estimated position of the at least one signal field symbol, and the extracted coding rate of the received frame.

22 Claims, 16 Drawing Sheets

SYSTEM AND METHOD FOR DETECTING A FRAME FORMAT

FIELD OF THE INVENTION

The present invention relates to a wireless communication system and more particularly relates to a system and method for detecting a frame format in the wireless communication system.

BACKGROUND

In the past decade, there has been enormous development in the area of wireless communication systems. Particularly, wireless local area network (WLAN) technology has emerged as one of the prevailing wireless technologies throughout the world. Also, in the fourth-generation, the WLAN technology may play an important role in the wireless and mobile communication systems.

Typically, WLAN devices may operate in accordance with one or more protocol standards including, but not limited to, IEEE 802.11. Moreover, the protocol standards for the WLAN devices are upgraded based on certain factors, such as the data rate and throughput requirements, in the communication system. For example, the IEEE 802.11 specification has evolved to IEEE 802.11 standard, which later evolved to IEEE 802.11b standard. Further, the 802.11b standard has evolved to IEEE 802.11g standard and then to IEEE 802.11n standard.

In addition, the WLAN devices may include legacy devices, high throughput (HT) devices, and very high throughput (VHT) devices. The legacy devices are compliant to IEEE 802.11abg standards. Also, the legacy devices may provide a maximum data rate of 54 Mbps. On the other hand, the high throughput (HT) devices are compliant to IEEE 802.11n standard. With the development of MIMO-OFDM technology, the HT devices may provide a maximum data rate of 600 Mbps. In a similar manner, the VHT devices are compliant to IEEE 802.11ac standard. Moreover, there has been development in a very high throughput physical layer and a medium access controller (MAC) layer of the VHT devices to support a data rate of more than 1 Gbps.

Typically, a device that is complaint to IEEE 802.11n standard should be backward compatible to the legacy devices supporting a legacy frame format in addition to HT mixed and green-field formats. Similarly, a device that is complaint to IEEE 802.11ac standard should be backward compatible to the legacy devices and HT devices supporting legacy and HT frame formats in addition to its own VHT mixed format. To achieve this compatibility, a device at a receiver end should be capable of detecting the format of the frame for successful decoding of the frame/packet. Thus, proper detection of the frame format is very crucial in the wireless communication systems.

In a conventional system, signal fields in a received frame are employed to detect the frame format. Particularly, the frame format is detected based on decoded bits in the signal fields and phase rotations of the signal fields. However, the decoded bits and phase rotations in the signal fields may be incorrect due to multipath fading and degradation of the frame prior to reaching a receiver. For example, a signal may travel through a wireless multipath channel, and the signal may undergo various forms of degradation before reaching the receiver. This degradation of the signal may cause the decoded bits to go wrong at the receiver, which further causes wrong detection of the frame format.

It is therefore desirable to develop a robust detection technique that is capable of detecting the frame format even under multipath channel and fading conditions.

SUMMARY

Briefly in accordance with one aspect of the technique, a method for detecting a format of a frame in a communication system is presented. The method includes receiving the frame comprising a plurality of orthogonal frequency division multiplexing (OFDM) symbols. The plurality of OFDM symbols may include at least one signal field symbol. The method further includes determining a modulation associated with the at least one signal field symbol. The modulation may be a first modulation or a second modulation. Also, the method includes estimating a position of the at least one signal field symbol among the plurality of symbols, and extracting a coding rate of the received frame. The method then includes detecting the format of the received frame based on the determined modulation and the estimated position of the at least one signal field symbol, and the extracted coding rate of the received frame.

In accordance with a further aspect of the present technique, an apparatus to detect a format of a frame is presented. The apparatus includes a receiver configured to receive the frame comprising a plurality of orthogonal frequency division multiplexing (OFDM) symbols. The plurality of OFDM symbols may include at least one signal field symbol. The apparatus further includes a scrutinizing unit communicatively coupled to the receiver, and configured to determine a modulation associated with the at least one signal field symbol. The apparatus also includes a counting unit communicatively coupled to the receiver, and configured to estimate a position of the at least one signal field symbol among the plurality of symbols. In addition, the apparatus includes a control unit configured to extract a coding rate of the received frame. The apparatus then includes a detecting unit configured to detect the format of the frame based on the determined modulation and the estimated position of the at least one signal field symbol, and the extracted coding rate of the received frame.

In accordance with another aspect of the present technique, a method for detecting a frame format in a communication system is presented. The method includes receiving the frame comprising a plurality of orthogonal frequency division multiplexing (OFDM) symbols. The plurality of OFDM symbols may include at least a first signal field symbol, a second signal field symbol, and a third signal field symbol. The method further includes detecting that the frame is associated with a high through-put green-field (HT-GF) format when the first signal field symbol is of a quadrature binary phase shift keying (Q-BPSK) modulation. The method also includes detecting that the frame is associated with a legacy format when the first signal field symbol is of a binary phase shift keying (BPSK) modulation, and a coding rate of the received frame is above a threshold coding rate. The method then includes detecting that the frame is associated with a high through-put mixed mode (HT-MM) format when the second signal field symbol is of the Q-BPSK modulation, and at least the first signal field symbol is of the BPSK modulation. Thereafter, the method includes detecting that the frame is associated with a very high through-put (VHT) format when the third signal field symbol is of the Q-BPSK modulation, and at least each of the first signal field symbol and the second signal field symbol is of the BPSK modulation. In addition, the method includes detecting that the frame is associated with the legacy format when each of the first signal field symbol, the second signal field symbol, and the third signal field symbol is of the BPSK modulation.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of an exemplary frame detector in a wireless communication system and method for detecting a frame format are presented. By employing the frame detector and the method for detecting the frame format hereinafter, wrong detection of the frame and error in decoding the frame may be substantially reduced in the wireless communication system. In addition, the exemplary frame detection method is a robust detection technique that is capable of detecting the frame format even under multipath channel and fading conditions.

Figure 1:
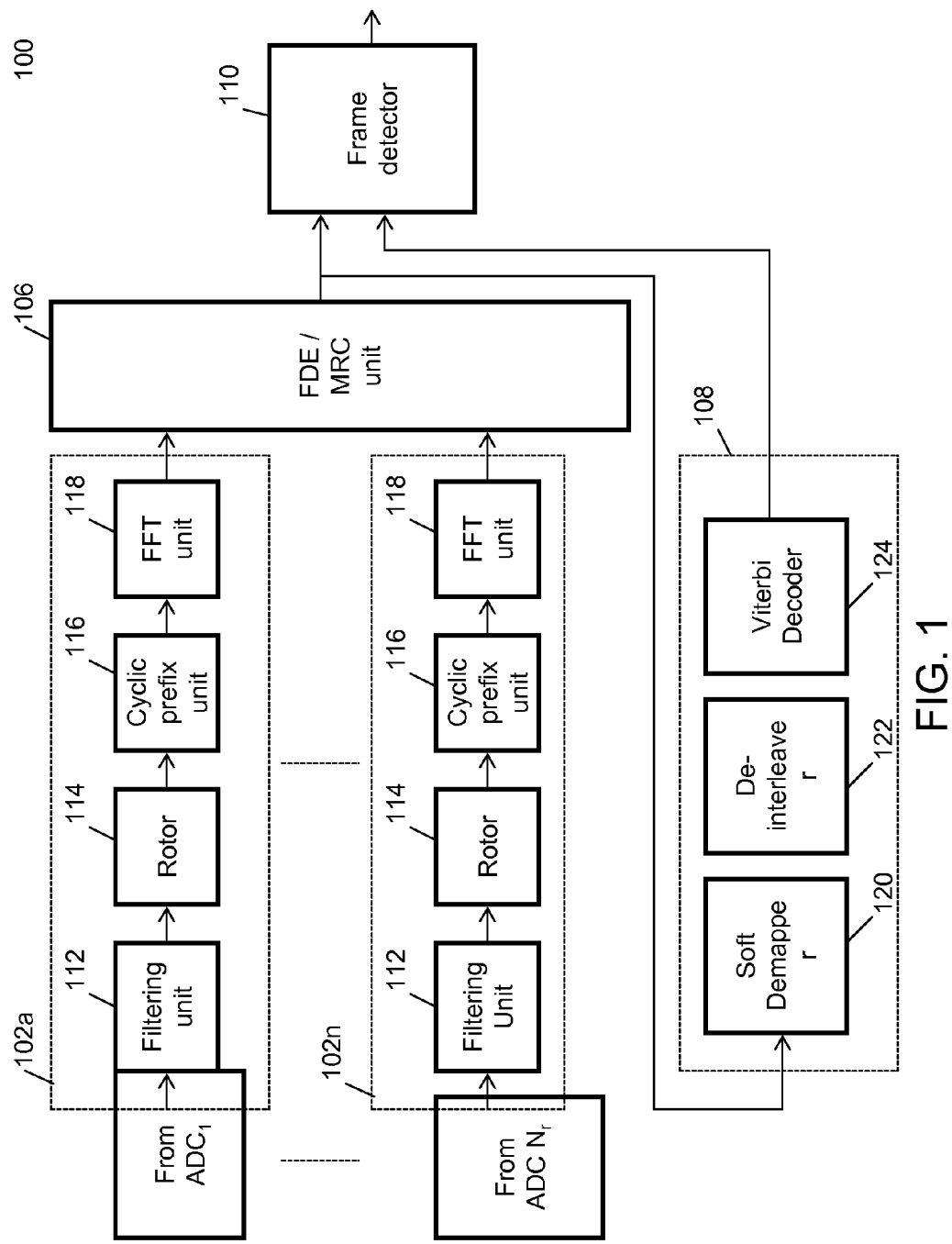
FIG. 1 illustrates a block diagram of a portion of a receiver system, in accordance with aspects of the present technique.

Turning now to the drawings, and referring to FIG. 1, a block diagram of a portion of a receiver system 100, in accordance with aspects of the present technique, is depicted. For ease of understanding, only the system level blocks that are relevant to the present technique are shown in FIG. 1. It is to be noted that the receiver system 100 may include other blocks, and is not limited to the blocks shown in FIG. 1.

Further, FIG. 1 illustrates an embodiment of the receiver system 100 coupled to multiple transmit and multiple receive (MIMO) antennas. The MIMO antennas in the receiver system 100 may receive a frame from different transmit chains of a transmitter system (not shown). Particularly, the MIMO antennas include multiple antennas, and each of the antennas is configured to receive the same frame from a corresponding transmit chain of the transmitter system. In one embodiment, the receiver system 100 may be communicatively coupled to a single antenna, which receives the frame from a single transmit chain of the transmitter system.

In accordance with aspects of the present technique, the receiver system 100 includes multiple receiver chains 102a-102n, a frequency domain equalizer/maximal ratio receiver combining (FDE/MRC) unit 106, a pre-decoding unit 108, and a frame detector 110. The multiple receiver chains 102a-102n are communicatively coupled between the MIMO antennas (not shown) and the FDE/MRC unit 106. Particularly, each of the receiver chains 102a-102n is coupled to a corresponding antenna in the MIMO antennas. For example, a first receiver chain 102a is communicatively coupled to a first antenna of the MIMO antennas. Similarly, an $n^{th}$ receiver chain 102n is communicatively coupled to an $n^{th}$ antenna of the MIMO antennas.

In addition, each of the receiver chains 102a-102n includes a filtering unit 112, a rotor unit 114, a cyclic prefix unit 116, and a Fast Fourier Transform (FFT) unit 118. The filtering unit 112, in each receiver chain, is communicatively coupled to a corresponding antenna of the MIMO antennas. Further, the filtering unit 112 receives analog to digital converter (ADC) samples from the corresponding antenna, and the noise embedded in the received ADC samples is removed or filtered from the ADC samples. The ADC samples may be associated with orthogonal frequency division multiplexing (OFDM) symbols in the received frame. In one embodiment, the filtering unit 112 may be a baseband filter that is configured to filter or remove the out-of-band noise from the ADC samples. The filtered ADC samples are then sent to the rotor unit 114 to compensate any frequency error in the filtered ADC samples. Upon compensating the frequency error, the ADC samples are forwarded to the cyclic prefix unit 116 to remove cyclic prefix of the OFDM symbol from the ADC samples. Thereafter, the ADC samples are transmitted to the FFT unit 118. The FFT unit 118 is configured to obtain frequency domain sub-symbols from the received ADC samples. Particularly, the FFT unit 118 is configured to obtain the frequency domain sub-symbols on used carriers of an OFDM symbol of the received frame.

Furthermore, the obtained sub-symbols are communicated to the FDE/MRC unit 106. It may be noted that if a single receiver chain and a single antenna are used to receive the frame, the obtained sub-symbols are equalized using a frequency domain equalizer (FDE) section of the FDE/MRC unit 106. However, for the MIMO antennas and the multiple receiver chains 102a-102n, a MRC section of the FDE/MRC unit 106 unit is employed to equalize the obtained sub-symbols.

In the embodiment illustrated in FIG. 1, the receiver system 100 includes multiple receiver chains 102a-102n, and thus, maximal ratio receiver combining (MRC) algorithm is applied to the received sub-symbols. More particularly, initial channel frequency response is estimated for each of the receiver chains 102a-102n. Further, the estimated initial channel frequency response on each of the receiver chains 102a-102n is used for maximal ratio receiver combining to obtain the actual symbol transmitted by the transmitter system. In one embodiment, if only a single receiver chain, for example 102a, is used in the receiver system 100, the sub-symbols received from that particular receiver chain are equalized using frequency domain equalizer to estimate the sub-symbols for each transmitted OFDM symbol by the transmitter system.

Thereafter, the obtained sub-symbols are sent from the FDE/MRC unit 106 to the frame detector 110 and the pre-decoding unit 108. The pre-decoding unit 108 is configured to decode bits from the received sub-symbols, and send the decoded bits of the symbol to the frame detector 110. In accordance with aspects of the present technique, the pre-decoding unit 108 includes a soft demapper 120, a de-interleaver 122, and a viterbi decoder 124. The soft demapper 120 is used to obtain soft bits from the received symbol. The obtained soft bits denote the confidence for each of the bits to be '1' or '0' bit. The obtained soft bits are then sent to the de-interleaver 122. The de-interleaver 122 performs an inverse operation as that of an interleaver at a transmitter (not shown). More specifically, the received soft bits are de-interleaved and sent to the Viterbi decoder 124. The Viterbi decoder 124 further generates the decoded bits from the received soft bits. Thereafter, the decoded bits are sent to the frame detector 110.

In accordance with aspects of the present technique, the frame detector 110 receives the symbol comprising of multiple sub-symbols from the FDE/MRC unit 106 and the decoded bits from the pre-decoding unit 108. The frame detector 110 processes the received symbol and determines a modulation type of the symbol and a position of the symbol among a plurality of symbols in the frame. The modulation type may be a first modulation or a second modulation. It may be noted that in the below description, the first modulation is referred to a binary phase shift keying (BPSK) modulation, and the second modulation is referred to a quadrature binary phase shift keying (Q-BPSK) modulation.

Furthermore, the position of the symbol may be a first position of the symbol, a second position of the symbol, or a third position of the symbol, among the plurality of symbols in the received frame. It may be noted that in the below description, the first position of the symbol is referred to a first signal field (SIG) symbol that is followed by initial training field (STF, LTF) symbols. For example, a legacy signal field (L-SIG) symbol in a legacy frame is placed in the first position (see FIG. 2). Similarly, the second position of the symbol is referred to a second signal field (SIG) symbol that is followed by the first signal field (SIG) symbol. For example, a high throughput signal field (HT-SIG) symbol in a HT-MM frame is placed in the second position. Also, the third position of the symbol is referred to a third signal field (SIG) symbol that is followed by the second signal (SIG) field symbol. For example, a second symbol of VHT-SIG-A in a VHT frame is placed in the third position (see FIG. 2). The position of the symbols in the frame and the frame types will be explained in greater detail with reference to FIG. 2

In addition to determining the modulation and the position of the symbols, the frame detector 110 also extracts a coding rate of the received frame. It may be noted that the coding rate is extracted only from a first legacy signal field symbol, i.e., L-SIG symbol, in the received frame. Particularly, the framed detector 110 extracts the coding rate from the decoded bits of the L-SIG symbol received from the pre-decoding unit 108. As per IEEE standard, the coding rate for the legacy frame is greater than or equal to ½, while the coding rate of other frames is equal to ½. For example, the other frames may include the HT-MM frame and the VHT frame. However, for HT-GF frame, the coding rate cannot be determined as the L-SIG symbol is not included in the HT-GF frame.

Thereafter, based on the modulation type and the position of the symbol, and the coding rate of the frame, the frame detector 110 detects a format of the frame. The format of the frame may be a first format, a second format, a third format, and a fourth format. It may be noted that in the below description the first format is referred to a format of the HT-GF frame, the second format is referred to a format of the HT-MM frame, the third format is referred to a format of the VHT frame, and the fourth format is referred to a format of the legacy frame. Furthermore, the detected frame format may then be indicated to a decoding unit (not shown) for successful decoding of the received frame. It is to be noted that the different frame formats and the process or method of detecting the frame format will be explained in greater detail with reference to FIGS. 2-6.

Figure 2:
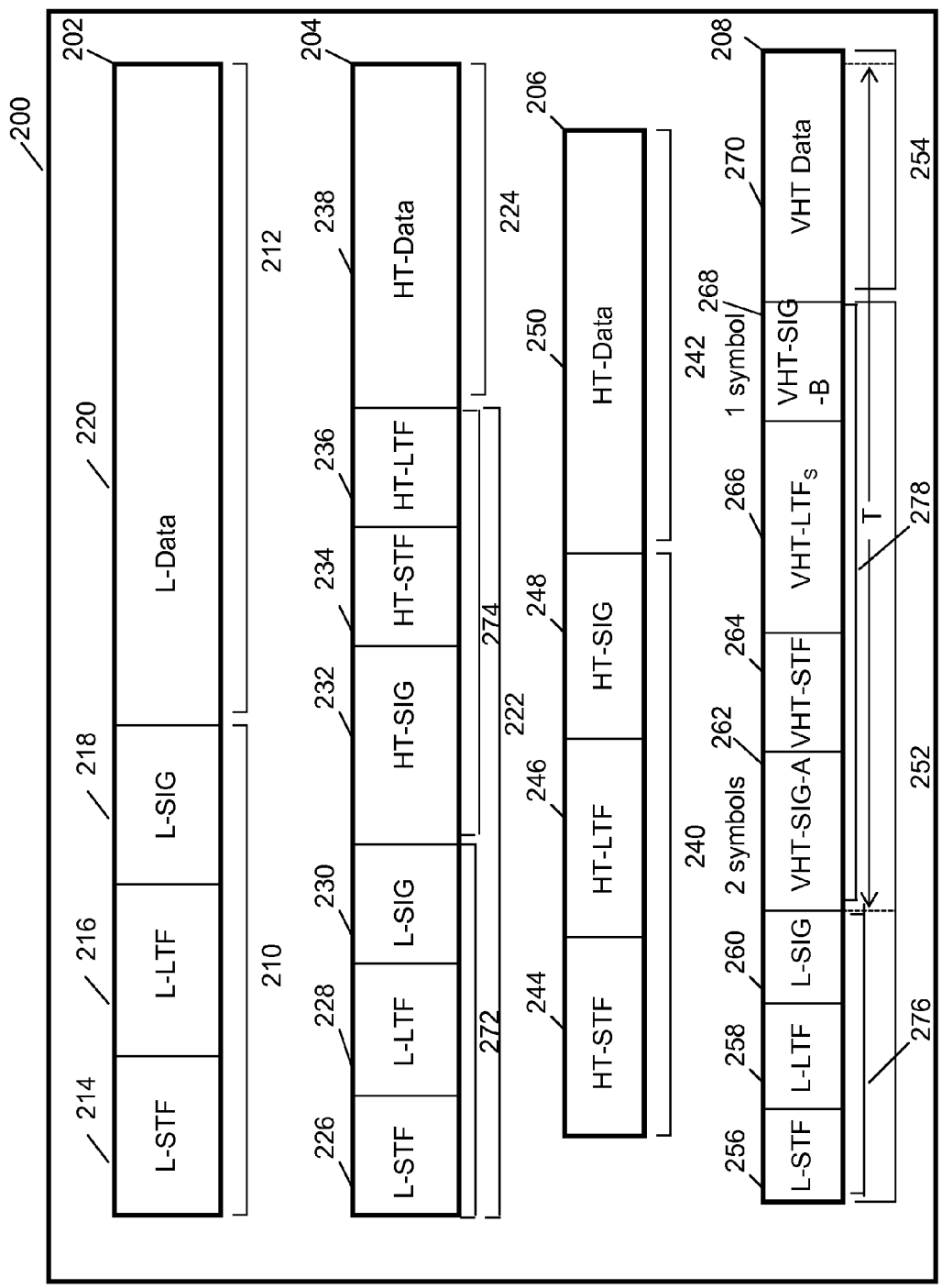
FIG. 2 is a block diagram illustrating frames in a legacy format, a high throughput-mixed mode (HT-MM) format, a HT-Greenfield (HT-GF) format, and a very high throughput (VHT) mixed format, in accordance with aspects of the present technique.

Referring to FIG. 2, a block diagram 200 illustrating frames in the legacy format, the high throughput-mixed mode (HT-MM) format, the HT-Greenfield (HT-GF) format, and the very high throughput (VHT) mixed format, in accordance with aspects of the present technique, is depicted. The legacy frame 202 is transmitted in a non-HT mode with a coding rate of greater than or equal to ½, and the format of the legacy frame 202 is as per the standard IEEE 802.11a/g specification. The legacy frame 202 includes a preamble portion 210 and a data portion 212. Further, the preamble portion 210 includes 10 short training field (L-STF) symbols 214, 2 long training field (L-LTF) symbols 216, and a legacy signal field (L-SIG) symbol 218. The short and long training field (STF and LTF) symbols 214, 216 are primarily used for packet detection, automatic gain control (AGC) and channel training. The signal field (SIG) symbol 218, as defined in the specification IEEE802.11a-1999, contains signal information pertaining to the data portion 212 of the frame 202. Particularly, the legacy signal field (L-SIG) symbol 218 includes the information of the data portion 212, such as data modulation, number of symbols, coding rate, and parity bit protection. The receiver system 100 uses this information, contained in the L-SIG symbol 218, to set-up the subsequent decoding process of data symbols 220.

Further, in the exemplary aspects of the present technique, the position of the L-SIG symbol 218, after the initial L-STF symbols 214 and the L-LTF symbols 216, is referred as the first position in the frame 202. Typically, every frame starts with at least two training field (STF and LTF) symbols 214, 216, and a slot or position after these two training field (STF and LTF) symbols 214, 216 is referred as the first position in the frame 202. Further, a position followed by this first position is referred as a second position, which is then followed by a third position. Thus, in legacy frame format, the signal field (L-SIG) symbol 218 is in the first position of the frame 202. In addition, the data symbols 220 in the legacy frame 202 may be modulated under various data rates. In one embodiment, the data 220 may be modulated at data rates of up to 54 Mbps.

In accordance with aspects of the present technique, the HT mixed mode frame 204 is transmitted in a HT mode with a coding rate equal to ½. It is to be noted that the coding rate is different from the data rate supported by the HT mixed mode frame. The format of the HT mixed mode frame 204 is as per the standard 802.11n specification. The HT mixed mode includes a preamble portion 222 and a data portion 224. The preamble portion 222 further includes a non-HT part 272 and a HT part 274. The non-HT part 272 of the preamble is similar to the preamble portion 210 of the legacy frame 202, which includes 10 short training field (L-STF) symbols 226, 2 long training field (L-LTF) symbols 228, and a signal field (L-SIG) symbol 230. The HT part 274 of the preamble portion 222 is followed by the non-HT part 272. The HT part 274 includes 2 HT signal field (HT-SIG) symbols 232, HT short symbols (HT-STF) 234, and HT long symbols (HT-LTF) 236, as depicted in FIG. 2. The HT signal field (HT-SIG) symbols 232 contain signal information pertaining to the data portion 224 of the frame 204. The HT part 274 of the preamble portion 222 is then followed by the data portion 224 that includes HT data (HT-data) 238. Further, it is to be noted that, in the HT-MM frame format, the L-SIG symbol 230 is in a first position in the frame 204, one of the 2 HT-SIG symbols 232 is in a second position in the frame 204, and the other of the 2 HT-SIG symbols 232 is in a third position in the frame 204.

Further, the HT-Greenfield (HT-GF) frame 206 is a new high throughput frame, and the format of the HT-GF frame 206 does not include a legacy part. For example, the HT-GF frame 206 does not include the preamble portion 210 of the legacy frame 202. The HT-GF frame 206 includes a preamble portion 240 and a data portion 242. The preamble portion 240 includes HT short training field (HT-STF) symbols 244, HT long training field (HT-LTF) symbols 246, and 2 HT signal field (HT-SIG) symbols 248, and they are arranged in a sequence as depicted in FIG. 2. The HT-SIG symbols contain the signal information pertaining to the data portion 242 of the frame 206. It is to be noted that, in the HT-Greenfield (HT-GF) frame format, one of the 2 HT signal field (HT-SIG) symbols 248 is at a first position, while the other of the 2 HT-SIG symbols is at a second position in the frame 206. Further, as previously noted, the HT-GF frame does not include legacy part, especially the first L-SIG symbol that contains coding rate information of the frame. Since the L-SIG symbol is absent in the HT-GF frame, the coding rate of the HT-SIG frame is also not extracted or determined for the HT-GF frame.

In a similar manner, the very high throughput (VHT) mixed frame 208 includes a preamble portion 252 and a data portion 254. The preamble portion 252 includes a legacy part 276 and a VHT part 278. The legacy part 276 includes 10 short training field (L-STF) symbols 256, 2 long training field (L-LTF) symbols 258, and a legacy signal field (L-SIG) symbol 260. The VHT part 276 of the preamble portion 252 includes VHT signal field (VHT-SIG-A) symbols 262, VHT short training field (VHT-STF) symbols 264, VHT long training field (VHT-LTF) symbols 266, and VHT signal field (VHT-SIG-B) symbol 268, as depicted in FIG. 2. Further, the VHT-SIG-A symbols 262 include two signal field symbols: a first VHT-SIG-A symbol and a second VHT-SIG-A symbol. However, the VHT-SIG-B 268 includes only one signal field symbol. In the exemplary aspects of the present technique, the L-SIG symbol 260 is placed at a first position in the VHT frame format, the first VHT-SIG-A symbol is placed at a second position in the VHT frame format, and the second VHT-SIG-A symbol is placed at a third position in the VHT frame format. In addition, the coding rate of the VHT frame 208 is equal to ½. It is to be noted that the coding rate is different from the data rate supported by the VHT frame format.

In accordance with aspects of the present technique, the legacy signal field symbol (L-SIG) includes information about the coding rate used by the legacy frame and payload length. Further, the HT-SIG or the VHT-SIG includes information about the modulation and coding scheme (MCS) and payload length of HT-MM or VHT mixed frame formats. It is to be noted that the signal field symbols may include other information, and is not limited to the above mentioned information. Further, the data for the L-SIG symbol 218, 230, 260 is encoded using ½ rate convolution encoder and is modulated using binary phase shift keying (BPSK) modulation. Similarly, the data for the first VHT-SIG-A symbol in the VHT-SIG-A symbols 262 is encoded using ½ rate convolution encoder and is modulated using the BPSK modulation. However, the data for the HT-SIG symbols 232, 248 that include two OFDM symbols is encoded using ½ rate convolution encoder and is modulated using Quadrature BPSK modulation (Q-BPSK). In a similar manner, the second VHT-SIG-A symbol of the VHT-SIG-A symbols 262 is encoded using ½ rate convolution encoder and is modulated using the Q-BPSK modulation.

Moreover, the above mentioned frames are typically transmitted using a standard baseband OFDM transmitter. Particularly, the OFDM symbols in each frame may be transmitted either using single transmit chain or multiple transmit chains. Further, during the transmission of the training field symbols, such as L-STF, L-LTF, HT-STF, HT-LTF, VHT-STF, and VHT-LTF, of any frame format, the mapped symbols are directly loaded onto used carriers from lookup tables. Further, each sub-symbol in the signal field (SIG) symbol may be encoded and mapped using either binary phase shift keying (BPSK) or Quadrature BPSK (BPSK rotated by 90 degrees) modulation. Thereafter, the mapped sub-symbols are converted to parallel stream and pilots are inserted at appropriate locations. In addition, the inverse discrete Fourier transform (IDFT) is used to modulate the OFDM symbols by loading these sub-symbols on used carriers. Further, the cyclic prefix is added to the OFDM symbols before passing through a FIR filter. The FIR filter is employed to perform FIR filtering to the received OFDM symbols so as to meet the transmitter spectral mask of the IEEE standard. The output samples from this filter are then sent to transmitter analog front end (AFE) to transmit the symbols to the receiver system 100.

Figure 3:
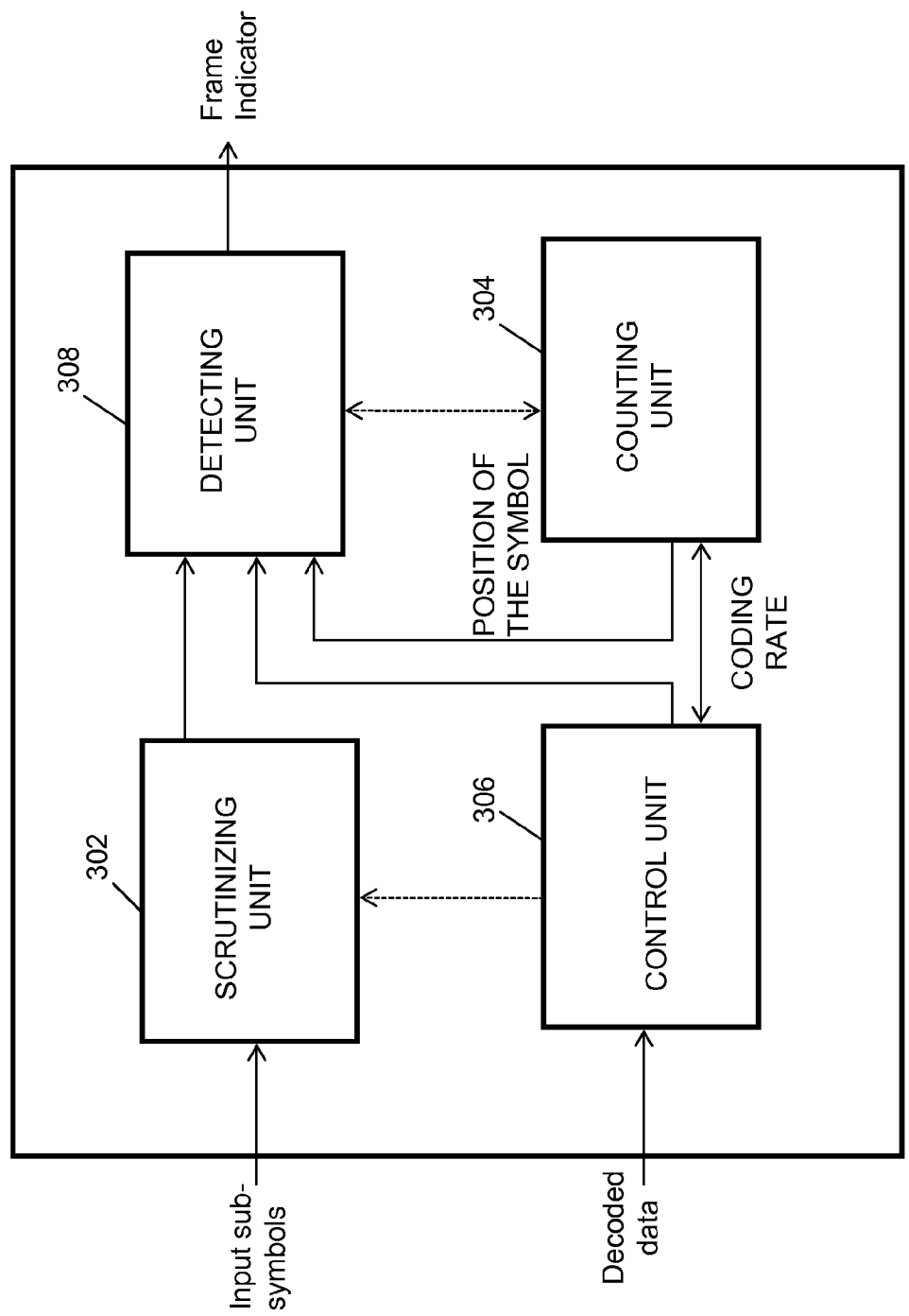
FIG. 3 illustrates a block diagram of a frame detector, in accordance with aspects of the present technique.

FIG. 3 illustrates a block diagram of a frame detector 300, in accordance with aspects of the present technique. The frame detector 300 may be a representative of the frame detector 110 of FIG. 1. The frame detector 300 is employed to detect a format of a frame received by the receiver system 100. The received frame may be the legacy frame, the HT-MM frame, the HT-GF frame, or the VHT mixed frame. Further, the received frame may include at least a signal field (SIG) symbol as one among the plurality of symbols in the frame. Moreover, the SIG symbol may include information that is used for detecting the format of the frame.

In addition, the frame may include STF and LTF symbols that are used for frame and frequency synchronization. Also, using the initial LTF, channel frequency response is estimated, which is further used for channel equalization of symbols that are followed by STF and LTF symbols. Particularly, the channel equalization of sub-symbols of each symbol is performed after OFDM demodulation using Discrete Fourier Transform (DFT).

In accordance with aspects of the present technique, the frame detector 300 includes a scrutinizing unit 302, a counting unit 304, a control unit 306, and a detecting unit 308. The scrutinizing unit 302 is communicatively coupled to the FDE/MRC unit 106 of the receiver system 100 of FIG. 1. The scrutinizing unit 302 is configured to receive the symbols of the frame. Particularly, the scrutinizing unit 302 receives sub-symbols of each symbol from the FDE/MRC unit 106. The scrutinizing unit 302 then determines a modulation associated with the received symbol. More specifically, the scrutinizing unit 302 obtains a real part and an imaginary part of each of the sub-symbols. Further, the scrutinizing unit 302 computes absolute values associated with the obtained real part of each of the sub-symbols. Similarly, the scrutinizing unit 302 computes absolute values associated with the imaginary part of each of the sub-symbols.

Upon computing the absolute values, the scrutinizing unit 302 sums or accumulates the absolute values associated with the real part of each of the sub-symbols. In a similar manner, the scrutinizing unit 302 sums the absolute values associated with the imaginary part of each of the sub-symbols. Thereafter, the sum of the absolute values associated with the real part is compared with the sum of the absolute values associated with the imaginary part to determine the modulation associated with the received symbol. For example, if the sum of the absolute values associated with the real part is greater than the sum of the absolute values associated with the imaginary part, the modulation associated with the symbol is determined as a BPSK modulation or a first modulation. Otherwise, the modulation associated with the symbol is determined as a Q-BPSK modulation or a second modulation. The aspect of determining the modulation type of the received symbol will be explained in greater detail with reference to FIG. 4.

In addition, the counting unit 304 is configured to count the number of symbols processed at the frame detector 300. Particularly, the counting unit 304 estimates a position of the received symbol among the plurality of symbols in the frame. For example, if the symbol is HT-SIG symbol, the counting unit 304 estimates whether the HT-SIG symbol is in the first position, the second position or, the third position in the frame. However, if the symbol is L-SIG symbol, the counting unit 304 directly estimates that the symbol is in the first position. This is because if a frame includes the L-SIG symbol then that L-SIG symbol is always placed at the first position in the frame.

More specifically, if the signal field symbol is received and processed for the first time, the counting unit 304 estimates the position of the received signal field symbol as the first position in the frame. Further, if another signal field symbol is received and processed, the counting unit 304 estimates the position of another signal field symbol as the second position in the frame. Furthermore, if one more second signal field symbol is received and processed, the counting unit 304 estimates the position of one more signal field symbol as the third position in the frame.

Moreover, while scrutinizing the received symbol and estimating the position of the received symbol, the control unit 306 receives the decoding bits of the received symbol from the pre-decoding unit 108 of FIG. 1. The control unit 306 extracts the coding rate when the estimated position of the received symbol is below a predefined position. The predefined position may be the second position in the frame. Particularly, the control unit 306 identifies whether the received symbol is the signal field symbol, and the received symbol is in the first position of the frame. Since the coding rate is embedded in the first signal field of the frame, the counting unit 306 processes the decoding bits only if the signal field symbol is in the first position of the frame and the modulation type of the signal field symbol is of BPSK modulation. Moreover, the control unit 306 computes or processes the decoding bits of the received symbol to extract a coding rate of the received frame. Typically, the coding rate of the legacy frame is above or equal to ½, while the coding rate of HT MM or VHT mixed frames is equal to ½.

In accordance with aspects of the present technique, the detecting unit 308 receives the modulation type of the received symbol from the scrutinizing unit 302, the coding rate of the received frame from the control unit 306, and the position of the received symbol from the counting unit 304, as depicted in FIG. 3. Thereafter, the detecting unit determines the format of the received frame based on the modulation type and the position of the received symbol, and the coding rate of the received frame. For example, if the modulation type of the received symbol is the second modulation or Q-BPSK modulation, the position of the received symbol is the first position, then the frame is detected as the first frame format. Similarly, other frame formats are detected based on different combinations of the modulation type, the position of the symbols, and the coding rate of the frame. The method of determining other frames formats using the modulation type, the position, and the coding rate of the frame will be explained in greater detail with reference to FIGS. 5 and 6.

Figure 4:
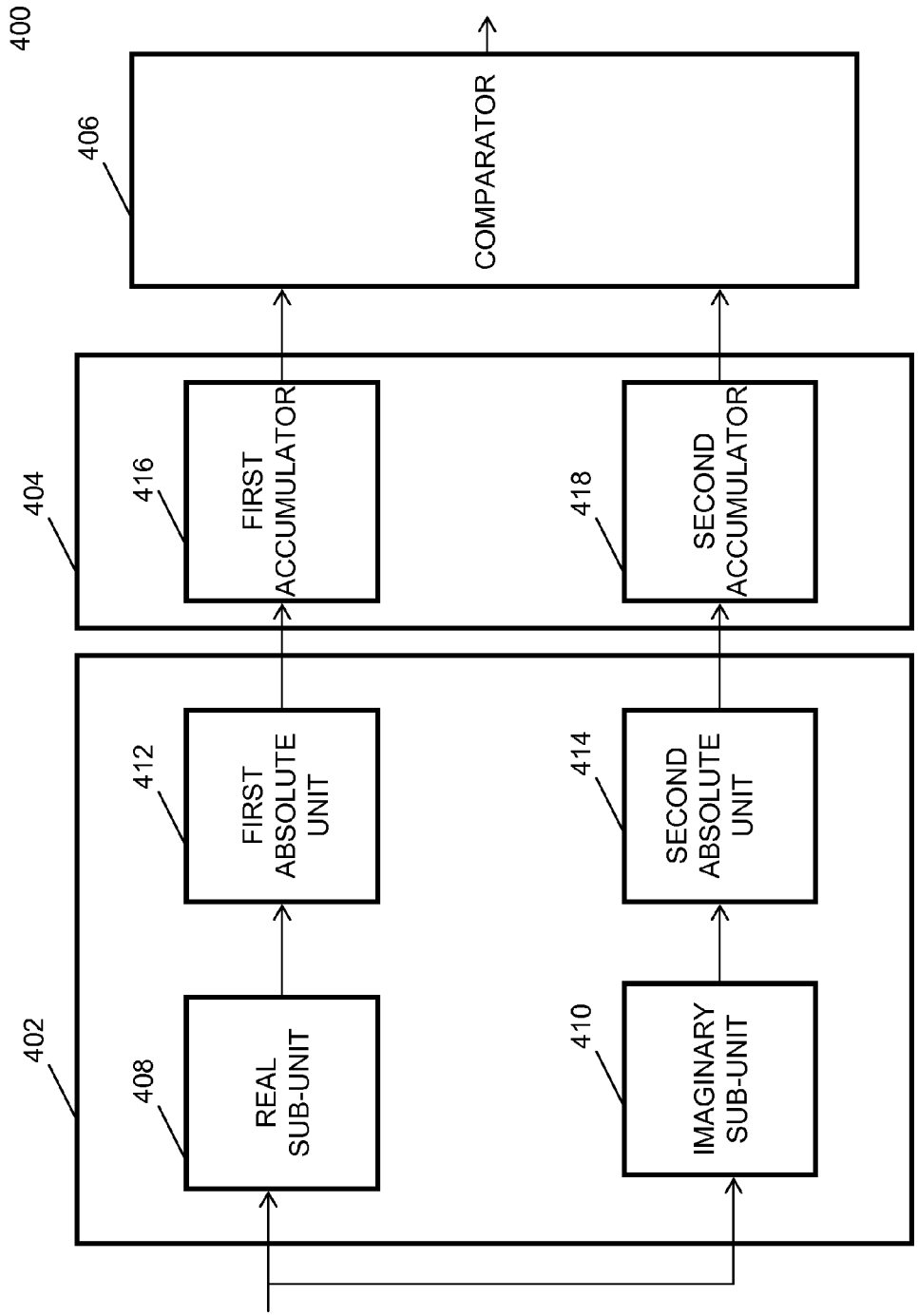
FIG. 4 illustrates a block diagram of a scrutinizing unit, in accordance with aspects of the present technique.

Referring to FIG. 4, a block diagram of a scrutinizing unit 400, in accordance with aspects of the present technique, is depicted. The scrutinizing unit 400 is representative of the scrutinizing unit 302 of FIG. 3. Initially, the frame and frequency synchronization for the received frame is performed based on the STF and the LTF information in the frame. Also, during initial LTF, the channel frequency response is estimated, which is further used for channel equalization of the symbols followed to the initial STF and LTF symbols.

The scrutinizing unit 400 includes a processing unit 402, an accumulating unit 404, and a comparator 406. The processing unit 402 receives a symbol that includes equalized sub-symbols. The equalized sub-symbols in the received symbol are represented by $R_1(k)$, where k represents indices of all data carriers. The processing unit 402 includes a real sub-unit 408, an imaginary sub-unit 410, a first absolute unit 412, and a second absolute unit 414. The real sub-unit 408 obtains real parts of the equalized sub-symbols while, the imaginary sub-unit 410 obtains imaginary parts of the equalized sub-symbols. Further, the first absolute unit 412 is coupled to the output of the real sub-unit 408, and is configured to compute absolutes values for the real parts of the sub-symbols. Similarly, the second absolute unit 414 is coupled to the output of the imaginary sub-unit 410, and is configured to compute absolute values for the imaginary parts of the sub-symbols.

The computed absolute values for the real parts and the imaginary parts of each of the sub-symbols are then sent to the accumulating unit 404. The accumulating unit 404 includes a first accumulator 416 and a second accumulator 418. The first accumulator 416 is coupled to the output of the first absolute unit 412, and is configured to sum the absolute values of the real parts received from the first absolute unit 412. Similarly, the second accumulator is coupled to the output of the second absolute unit 414, and is configured to sum the absolute values of the imaginary parts received from the second absolute unit 414. Further, the sum of absolute values of the real parts and the imaginary parts are then sent to the comparator 406. The comparator 406 then determines whether the symbol includes the first modulation or the second modulation based on the sum of absolute values of the real part and the imaginary part of the sub-symbols.

In accordance with the aspects of the present technique, the combination of the processing unit 402, the accumulating unit 404, and the comparator 406 may be employed for determining the modulation type of the received symbols. Also, the method or algorithm of determining the modulation type for two cases, such as the single antenna and the MIMO antennas, are mathematically explained below. In the first case, the single antenna is used for receiving the frame, and thus the number of receiver antennas ($N_r$) will be equal to one.

For $N_r=1$, let X(k) be the $k^{th}$ sub-symbol of the transmitted OFDM symbol and H(k) be the channel frequency response of $k^{th}$ carrier where k represents indices of used subcarriers $N_u$. The Z(k) be the additive white Gaussian noise (AWGN) at $k^{th}$ carrier with zero mean and variances $\sigma^{-2}$. Then, the received demodulated sub-symbol at the output of the DFT is given by the following equation:

$$R(k) = H(k)X(k) + Z(k), \quad (1)$$

$$\text{where } k = \frac{-N_u}{2} \text{ to } \frac{N_u}{2} - 1$$

Since either BPSK (using $\text{Alphabet}_{A_R=\{-1,1\}}$) or Quadrature BPSK modulation (using $\text{Alphabet}_{A_I=\{-j,j\}}$) is used to load signal fields, the condition for determining that Quadrature BPSK was used in the present received OFDM symbol, the following condition must be satisfied with the below equation:

$$P\left(\frac{\{R(\frac{-N_u}{2}), R(\frac{-N_u}{2}+1) \ldots R(\frac{N_u}{2}-1)\}}{\{H(\frac{-N_u}{2}), H(\frac{-N_u}{2}+1) \ldots H(\frac{N_u}{2}-1)\}, A_I}\right) > \tag{2}$$

$$P\left(\frac{\{R(\frac{-N_u}{2}), R(\frac{-N_u}{2}+1) \ldots R(\frac{N_u}{2}-1)\}}{\{H(\frac{-N_u}{2}), H(\frac{-N_u}{2}+1) \ldots H(\frac{N_u}{2}-1)\}, A_R}\right)$$

In the equation (2), P( . . . ) represents a joint conditional probability of received sub-symbols given channel frequency response and constellation alphabet. As the conditional probability of each received sub-symbol is independent of all others, the equation (2) may be represented as:

$$\prod_k P\left(\frac{R(k)}{H(k), A_I}\right) > \prod_k P\left(\frac{R(k)}{H(k), A_R}\right) \tag{3}$$

Since Z(k) is additive white, using the equation (1), the conditional probability of R(k) may be shown as:

$$P\left(\frac{R(k)}{H(k), A_I}\right) = \frac{1}{\sqrt{2\Pi\sigma^2}} \exp\left(\frac{-|R(k) - H(k)\alpha|^2}{2\sigma^2}\right) \tag{4}$$
where $\alpha \in A_I$ $$P\left(\frac{R(k)}{H(k), A_R}\right) = \frac{1}{\sqrt{2\Pi\sigma^2}} \exp\left(\frac{-|R(k) - H(k)\alpha|^2}{2\sigma^2}\right) \tag{5}$$
where $\alpha \in A_R$ Using equations (4) and (5), the equation (3) will be represented as:

$$\prod_{\substack{k \\ \alpha \in A_I}} \frac{1}{\sqrt{2\Pi\sigma^2}} \exp\left(\frac{-|R(k) - H(k)\alpha|^2}{2\sigma^2}\right) > \tag{6}$$

$$\prod_{\substack{k \\ \alpha \in A_R}} \frac{1}{\sqrt{2\Pi\sigma^2}} \exp\left(\frac{-|R(k) - H(k)\alpha|^2}{2\sigma^2}\right)$$

Canceling common terms and after simplification, the equation (6) is further simplified to:

$$\sum_{\substack{k \\ \alpha \in A_I}} \frac{-|R(k) - H(k)\alpha|^2}{2\sigma^2} > \sum_{\substack{k \\ \alpha \in A_R}} \frac{-|R(k) - H(k)\alpha|^2}{2\sigma^2} \tag{7}$$

Cancelling common terms in the equation (7) and expanding squared terms, the equation (7) may be represented as show below:

$$\sum_{\substack{k \\ \alpha \in A_I}} -(|R(k)|^2 + |H(k)\alpha|^2 - R^*(k)H(k)\alpha - R(k)H^*(k)\alpha^*) > \tag{8}$$

$$\sum_{\substack{k \\ \alpha \in A_R}} -(|R(k)|^2 + |H(k)\alpha|^2 - R^*(k)H(k)\alpha - R(k)H^*(k)\alpha^*)$$

Cancelling common terms in the equation (8) and using the relations Im(x)=j(x*−x) and Re(x)=x+x*, the equation (8) may be further simplified as shown below:

$$\sum_{\substack{k \\ \alpha \in A_I}} \text{Im}\{R(k)H^*(k)\alpha^*\} > \sum_{\substack{k \\ \alpha \in A_R}} \text{Re}\{R(k)H^*(k)\alpha\} \tag{9}$$

Using the equation (1), $A_I$ and $A_R$, the equation (9) can be shown as:

$$\sum_k |\text{Im}\{R(k)H^*(k)\}| > \sum_k |\text{Re}\{R(k)H^*(k)\}| \tag{10}$$

Where |x| represents absolute value of x. Since noise is uncorrelated with sub-symbols of transmitted OFDM symbol, the contribution of noise in the above summations is ignored. In the single tap frequency domain equalization, R(k) is multiplied with the conjugate of channel frequency response H*(k) and the equalized symbol is represented as $R_1(k)$, the equation (10) may be simplified as:

$$\sum_k |\text{Im}\{R_1(k)\}| > \sum_k |\text{Re}\{R_1(k)\}| \tag{11}$$

The condition given in equation (11) is used to determine that particular OFDM symbol is loaded with Quadrature BPSK sub-symbols. Particularly, in equation (11), if sum of the absolute values of imaginary part of the loaded sub-symbols is greater than the sum of absolute values of real part of the loaded sub-symbols, the modulation associated with the sub-symbols is determined as Q-BPSK modulation. Otherwise, the modulation associated with the sub-symbols is determined as BPSK modulation.

In accordance with aspects of the present technique, the second case is taken into consideration, where the MIMO antennas are used for receiving the frame, and thus the number of receiver antennas ($N_r$) will be greater than 1 ($N_r > 1$).

For $N_r > 1$, the demodulated sub-symbols at the output of DFT on different receive chains are given by the following equation:

$$R_m(k) = H_m(k)X(k) + Z_m(k) \tag{12}$$

$$m = 0, 1, 2 \ldots N_r - 1 \text{ and } k = \frac{-N_u}{2} \text{ to } \frac{N_u}{2} - 1$$

Combining $R_m(k)$ using maximum ratio combining (MRC) for diversity gain, the combined sub-symbols are given by the following equation:

$$R_c(k) = \sum_{m=0}^{N_r-1} R_m(k)H_m^*(k) \qquad (13)$$

Substituting the equation (12) into the equation (13), the equation (13) is represented as:

$$R_c(k) = \sum_{m=0}^{N_r-1} |H_m(K)|^2 X(k) + \sum_{m=0}^{N_r-1} |H_m^*(K)|Z_m(k) \qquad (14)$$

Representing $$H_c(k) = \sum_{m=0}^{N_r-1} |H_m(K)|^2$$

and $$Z_c(k) = \sum_{m=0}^{N_r-1} |H_m^*(K)|Z_m(k),$$

the equation (14) may be shown as:

$$R_c(k) = H_c(k)X(k) + Z_c(k), \qquad (15)$$
$$k = \frac{-N_u}{2} \text{ to } \frac{N_u}{2} - 1$$

From the central limit theorem, Z, (k) is Gaussian distributed with zero mean and variance $$\sum_{m=0}^{N_r-1} |H_m^*(K)|^2 \sigma^2.$$

Equation (15) is in the same form as equation (1). Therefore, the same steps given in equations (2) to (11) may be followed to arrive at the equation (11) to determine whether the particular OFDM symbol is loaded with Quadrature BPSK sub-symbols or BPSK sub-symbols.

Figure 5:
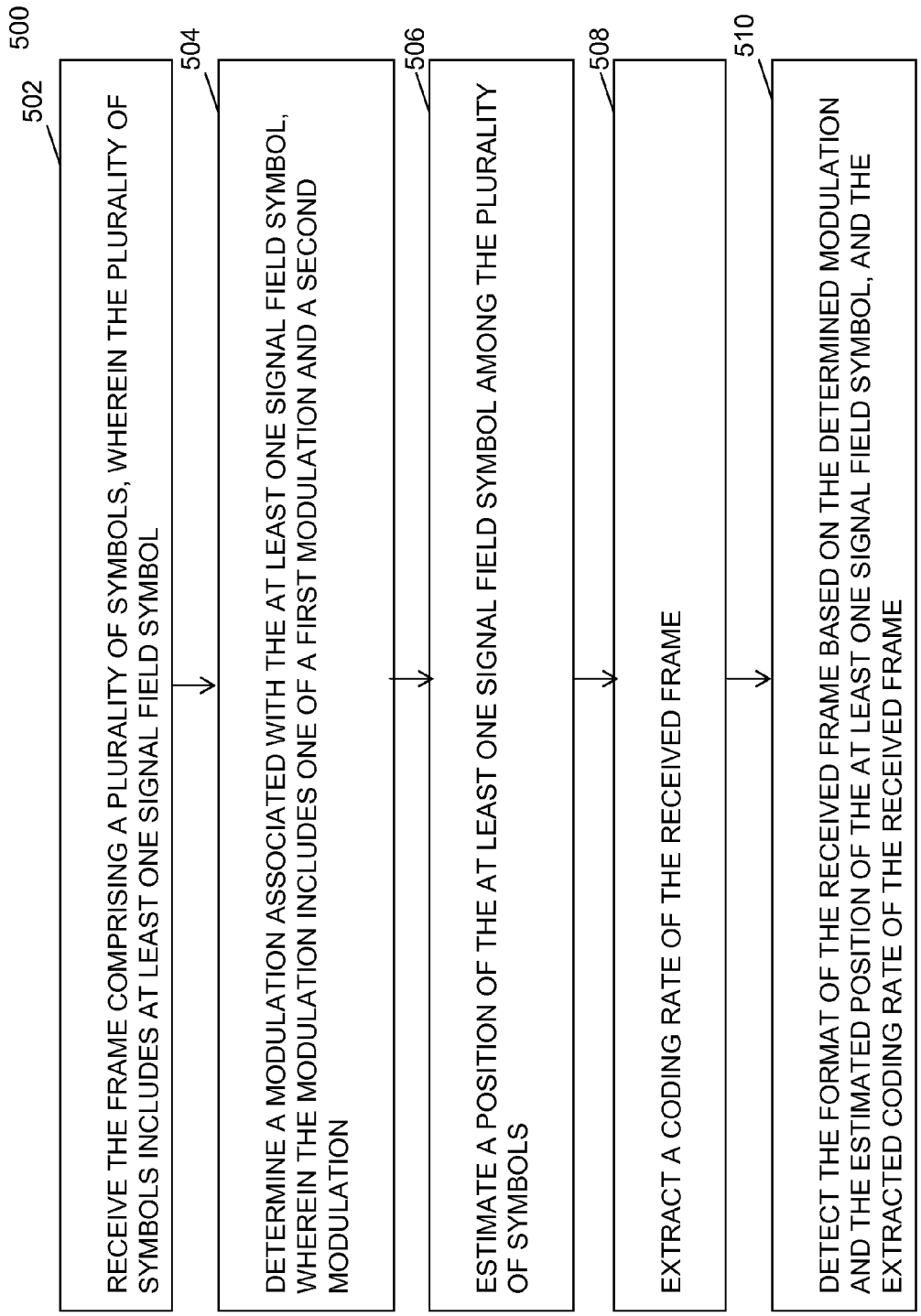
FIG. 5 is a flow chart illustrating a method of detecting a frame format, in accordance with aspects of the present technique.

Referring to FIG. 5, a flow chart illustrating a method 500 of detecting a frame format, in accordance with aspects of the present technique, is depicted. For ease of understanding of the present technique, the method is described with reference to the components of FIGS. 1-4. The method 500 begins at a step 502, where a frame comprising a plurality of symbols is received by the receiver system 100. The plurality of symbols includes at least one signal field symbol. For example, the legacy frame includes a legacy signal field (L-SIG) symbol, the HT-MM frame includes a legacy signal field (L-SIG) symbol and a high throughput signal field (HT-SIG) symbol, the HT-GF frame includes a HT-SIG symbol, and the VHT frame includes a L-SIG symbol, two VHT-SIG-A symbols, and a VHT-SIG-B symbol, as depicted in FIG. 2.

Subsequently, at step 504, the frame detector 110, 300 in the receiver system 100 receives sub-symbols of each symbol in the received frame. Particularly, the scrutinizing unit 302 in the frame detector 110, 300 receives the sub-symbols from the FDE/MRC unit 106 of FIG. 1. Upon receiving the sub-symbols of each symbol, the scrutinizing unit 302 determines a modulation associated with each symbol. More specifically, the scrutinizing unit 302 determines the modulation associated with the signal field symbol in the received frame. The modulation may be a BPSK modulation or a Q-BPSK modulation. It is to be noted that, in the below description, the BPSK modulation is referred as a first modulation, while the Q-BPSK modulation is referred as a second modulation. The exemplary method of determining the modulation associated with the symbol is explained in greater detail with reference to FIG. 4.

Furthermore, at step 506, the counting unit 304, in the frame detector 300, 110, is configured to count the number of symbols processed in the frame. More specifically, the counting unit in the frame detector 300, 110 estimates a position of the received symbol in the frame. For example, the L-SIG symbol 218 is at a first position in the legacy frame 202. Further, in the HT-MM frame 204, the L-SIG symbol 230 is at the first position and one of the HT-SIG symbols 232 is at a second position in the frame 204, while the other of the HT-SIG symbols 232 is at a third position in the frame 204. In the HT-GF frame 206, the one of the HT-SIG symbols 248 is at the first position in the frame 206, while the other of the HT-SIG symbols 248 is at the second position in the frame 206. Similarly, in the VHT frame 208, the L-SIG symbol 260 is at the first position, the first VHT-SIG-A symbol of the VHT-SIG-A symbols 262 is at the second position, and the second VHT-SIG-A symbol of the VHT-SIG-A symbols 262 is at the third position in the frame 208, as depicted in FIG. 2. Thus, the counting unit 304 estimates whether the received symbol is in the first position, the second position, or the third position in the frame.

Also, at step 508, the control unit 306 receives the decoding bits of the symbol processed by the scrutinizing unit 302. The control unit 306 receives these decoding bits from the pre-decoding unit 108 of FIG. 1. The decoding bits are processed to extract a coding rate of the received frame. It is to be noted that, the coding rate information is included in the first signal field (SIG) symbol of the legacy, the HT-MM, and the VHT frames. Thus, the control unit first determines whether the symbol is the first signal field symbol (SIG) in the frame. If the symbol is the first signal field symbol (SIG) and modulation format of the first signal field symbol is of BPSK modulation, the decoding bits of the corresponding symbol are processed to extract the coding rate of the frame. The coding rate of the legacy frame is different from the coding rate of the other frames such as, the HT-MM frame and the VHT frame. For example, the coding rate of the legacy frame is greater than or equal to ½, while the coding rate of the other frames is equal to ½.

At step 510, the detecting unit 308 in the frame detector 300, 110 receives the modulation information of the symbol from the scrutinizing unit 302, the position of the symbol from the counting unit 304, and the coding rate of the frame from the control unit 306. Further, the detecting unit 308 detects the format of the received frame based on the determined modulation, the estimated position of the symbol, and the extracted coding rate of the received frame. For example, if the modulation of the symbol is the Q-BPSK modulation or the second modulation and the symbol is at the first position in the frame, then the frame is detected as the HT-GF frame. Otherwise, if the coding rate is greater than ½, the modulation of the symbol is the BPSK modulation or the first modulation, and the symbol is at the first position, then the frame is detected as the legacy frame. In a similar way, other frame formats are detected based on the modulation and the position of symbols, and the coding rate of the frame. This aspect i explained in greater detail with reference to FIG. 6.

Figure 6:
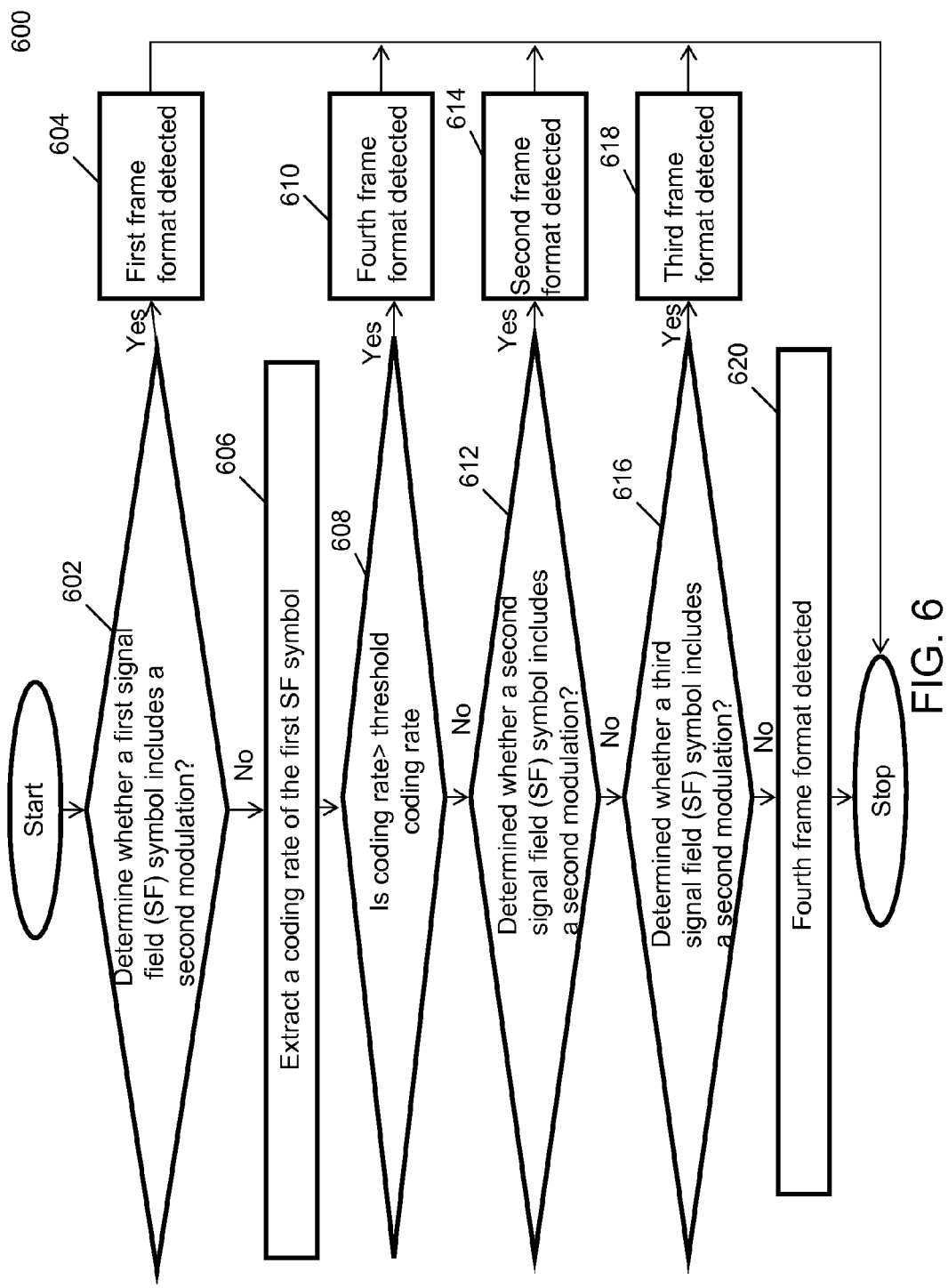
FIG. 6 is a flow chart illustrating the method of detecting the frame format, in accordance with aspects of the present technique.

FIG. 6 is a flow chart illustrating the method 600 of detecting the frame format, in accordance with aspects of the present technique. The method 600 illustrates the step 510 of FIG. 5. For ease of understanding of the present technique, the method 600 is described with reference to the components of FIGS. 1-4. The method begins at a step 602, where the frame detector 300, 110 determines whether the first signal field symbol in the frame includes a second modulation. As previously noted, the second modulation represents the Q-BPSK modulation while, the first modulation represents the BPSK modulation. If the first signal field symbol includes the second modulation, then the method 600 moves to a step 604, where the frame detector 300, 110 detects the format of the received frame as the first format or the HT-GF format. For example, among the different frame formats shown in FIG. 2, only the HT-GF frame 206 includes one of the HT signal field (HT-SIG) symbols 248 as the first signal field symbol, and also, the HT-SIG symbols 248 include the second modulation or the Q-BPSK modulation. Thus, the framed detector 300, 110 detects the received frame as the HT-GF frame 206. Further, since the frame detector 300, 110 processes/computes the signal field for a first time in the frame, the frame detector 300, 110 estimates that the first signal field symbol is at a first position in the received frame.

Moving back to the step 602, if the first signal field (SIG) symbol includes the first modulation or BPSK modulation, then the method moves to a step 606, where the frame detector 300, 110 extracts the coding rate of the received frame. Since the first signal field symbol includes the coding rate of the frame, the frame detector 300, 110 extracts this coding rate to identify whether the frame is the legacy frame or other frames. Particularly, the legacy frame has the coding rate more than or equal to ½ while, the other frames, such as the HT-MM frame, or the VHT frame, have the coding rate equal to ½.

Upon extracting the coding rate of the first signal field symbol, the method 600 continues with a step 608, where the frame detector 300, 110 compares the extracted coding rate with a threshold coding rate. In one embodiment, the threshold coding rate may be set to ½. In another embodiment, the threshold coding rate may be set to any desired coding rate to differentiate the frame formats. Further, if the coding rate of the received frame is greater than the threshold coding rate, the method 600 moves to a step 610, where the frame detector 300, 110 detects that the format of the received frame as the legacy frame format or fourth format. As previously noted, only the legacy frame has the coding rate greater than ½ or the threshold coding rate.

However, at the step 608, if the coding rate is equal to the threshold coding rate, the method 600 moves to a step 612, where a next signal field (SIG) symbol in the frame is processed. The next signal field (SIG) symbol followed by the first signal field symbol is referred as a second signal field (SIG) symbol. Particularly, the frame detector 300, 110 determines whether the second signal field (SIG) symbol includes the second modulation or the Q-BPSK modulation. Also, the frame detector 300, 110 determines that the second signal field symbol is at a second position in the received frame. If the second signal field (SIG) symbol includes the second modulation and the second SIG symbol is in the second position, the method 600 moves to a step 614, where the frame detector 300, 110 detects the format of the frame as the HT-MM frame format or the second format. As shown in FIG. 2, only the HT-MM frame 204 includes the first signal field symbol as the L-SIG symbol 230 having the first modulation, and the second signal field symbol as one of the HT-SIG symbols 232 having the second modulation. Thus, the frame detector 300, 110 detects the received frame as the HT-MM frame 204.

However, at the step 612, if the second signal field symbol includes the first modulation and the second signal field symbol is at the second position, the method 600 moves to a step 616, where the frame detector 300, 110 further processes a third signal field symbol of the received frame. The third signal field symbol is followed by the second signal field symbol. Particularly, the frame detector 300, 110 verifies whether the third signal field symbol includes the second modulation or Q-BPSK modulation. Also, the position of the third signal field (SIG) symbol is estimated as the third position in the frame. If the third signal field symbol includes the second modulation and the estimated position is the third position, the method 600 moves to a step 618, where the frame detector 300, 110 detects the format of the received frame as the VHT frame format or the third format. With reference to FIG. 2, it is clear that only the VHT frame 208 includes the first signal field symbol as the legacy signal field (L-SIG) symbol 260 having the first modulation, the second signal field symbol as the first VHT-SIG-A symbol 262 having the first modulation, and the third signal field symbol as the second VHT-SIG-A symbol 262 having the second modulation. Thus, the frame detector 300, 110 detects the received frame as the VHT frame 208.

However, if the third signal field symbol includes the first modulation, and not the second modulation, then the method 600 moves to a step 620, where the frame detector 300, 110 detects the format of the frame as the legacy frame format or the fourth format. Though the coding rate of the received frame is equal to ½, the frame detector 300, 110 detects the frame to be legacy frame because, all the symbols in the frame, such as the first, second, and third signal field symbols, include the first modulation or the BPSK modulation. Thus, by employing the above method 600, the frame detector 300, 110 accurately detects the frame format of the received frame even under multipath channel and fading conditions.

Referring to FIGS. 7-16, simulation results obtained by employing the system and method described in FIGS. 1-6 are depicted. These simulation results emphasize the usefulness of the present technique in real systems. Moreover, the simulations are performed in the multipath fading channels to prove that the present technique is a robust detection technique.

Further, to obtain the simulation results as depicted in FIGS. 7-16, a packet or frame is first formed with preamble, signal fields and data as shown in FIG. 2. Thereafter, the preamble of the frame is transmitted to enable the synchronization and the channel estimation of the receiver system 100 of FIG. 1. As previously noted with reference to FIG. 2, the preamble of the frame includes short symbols and long symbols. At the transmitter side, only one-fourth of the used subcarriers (12) are loaded for generating the short symbols, while 52 subcarriers are loaded for generating the long symbols. Further, transmission of the frame begins with first transmitting the preamble of the frame. The preamble is followed by signal field and then sequences of data field of the frame.

Moreover, to obtain the simulation results as depicted in FIGS. 7-16, the frame or signal is transmitted using an analog front end (AFE) modeled section with Tgn channel models and RF impairments. The AFE section consists of DAC/ADC, filters, up/down converters, AWGN, RF impairments and Tgn channel models (A, B, C, D, E and F). While transmitting the signal or frame from the transmitter side to the receiver side, the channel model introduces the pathloss and fading to the transmitted signal or frame. In the exemplary embodiment, the relation between the transmit power of the signal, SNR, and the path loss is given by the following equation:

$$\text{Path\_loss\_(db)} = TX\_POWER - SNR - N\_FIG \quad (16)$$

In equation (16), TX_POWER represents the power transmitted by a transmitter, SNR represents the required Signal to Noise Ratio (SNR) at the receiver, and N_FIG is the noise figure. In the simulation setup, the SNR is varied from 0 dB to 30 dB with and without fading using the Tgn channel models A, B, D and E. The channel models are selected to cover low, medium, and high delay spread scenarios. For each SNR, a different transmit frame is generated and passed through the channel and AWGN noise and other impairments.

At the receiver system 100, energy detection, AGC gain estimation, synchronization, carrier offset compensation and channel estimation are performed prior to using the method described in FIGS. 5 and 6 for detecting the frame format. In the exemplary setup, channel bandwidth of 20 MHz is used for simulations. The simulations are performed for 1000 realizations of channel and noise for legacy, HT, and VHT frame formats. Further, the number of correct frame detections and false frame detections are computed while transmitting a particular frame format (any of the frame formats shown in FIG. 2). Thereafter, the simulation results that are obtained with percentage of correct and false frame detections at different SNR are graphically represented in FIGS. 9-16. It may be noted that one transmit antenna and one receive antenna system (represented as 1×1), two transmit antennas and one receive antenna system (represented as 2×1), and two transmit antennas and two receive antennas system (represented as 2×2) may also be considered for the simulations.

Figure 7:
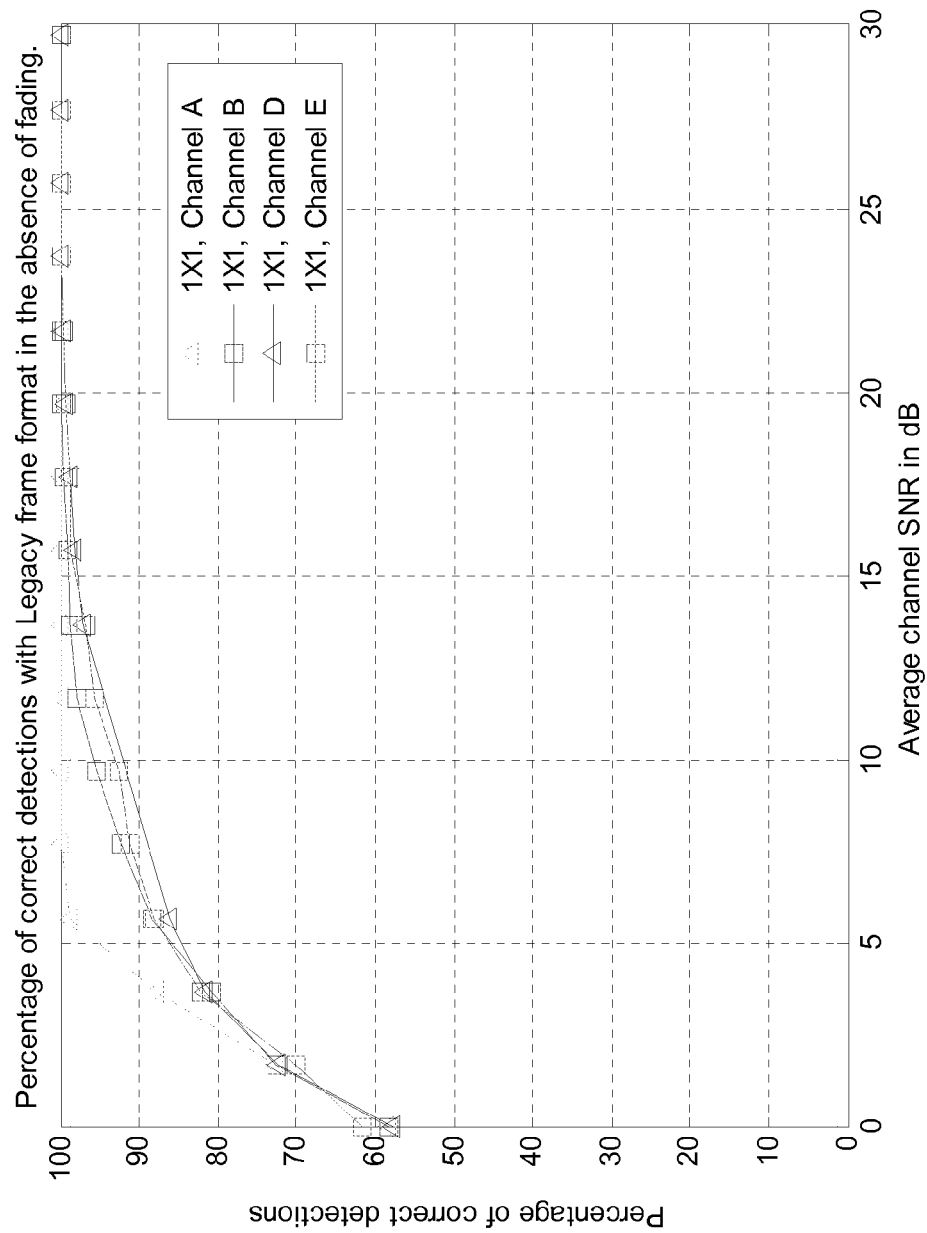
FIGS. 7-16 show simulation results obtained by employing the system and method described in FIGS. 1-6, in accordance with aspects of the present technique.
Figure 8:
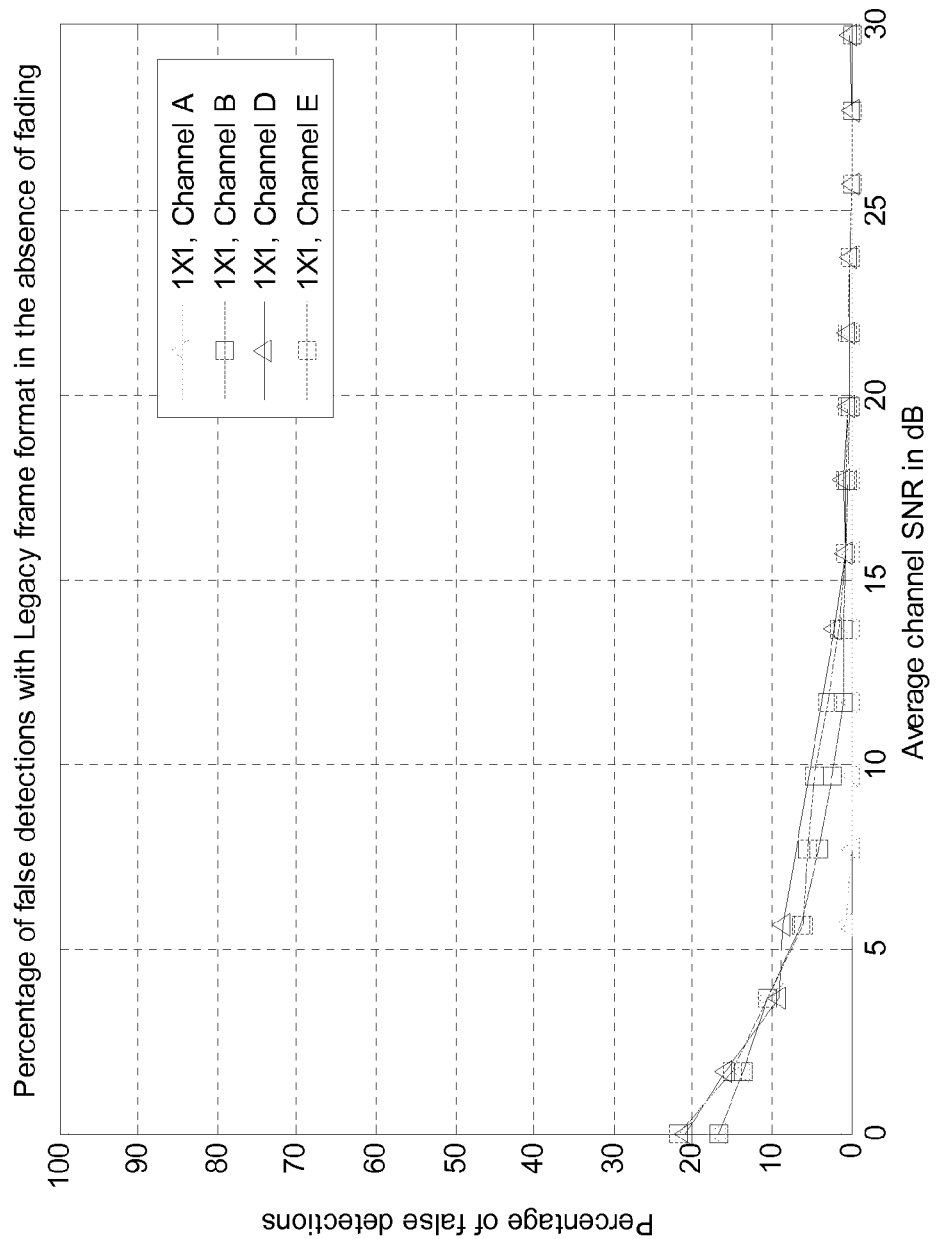
Figure 9:
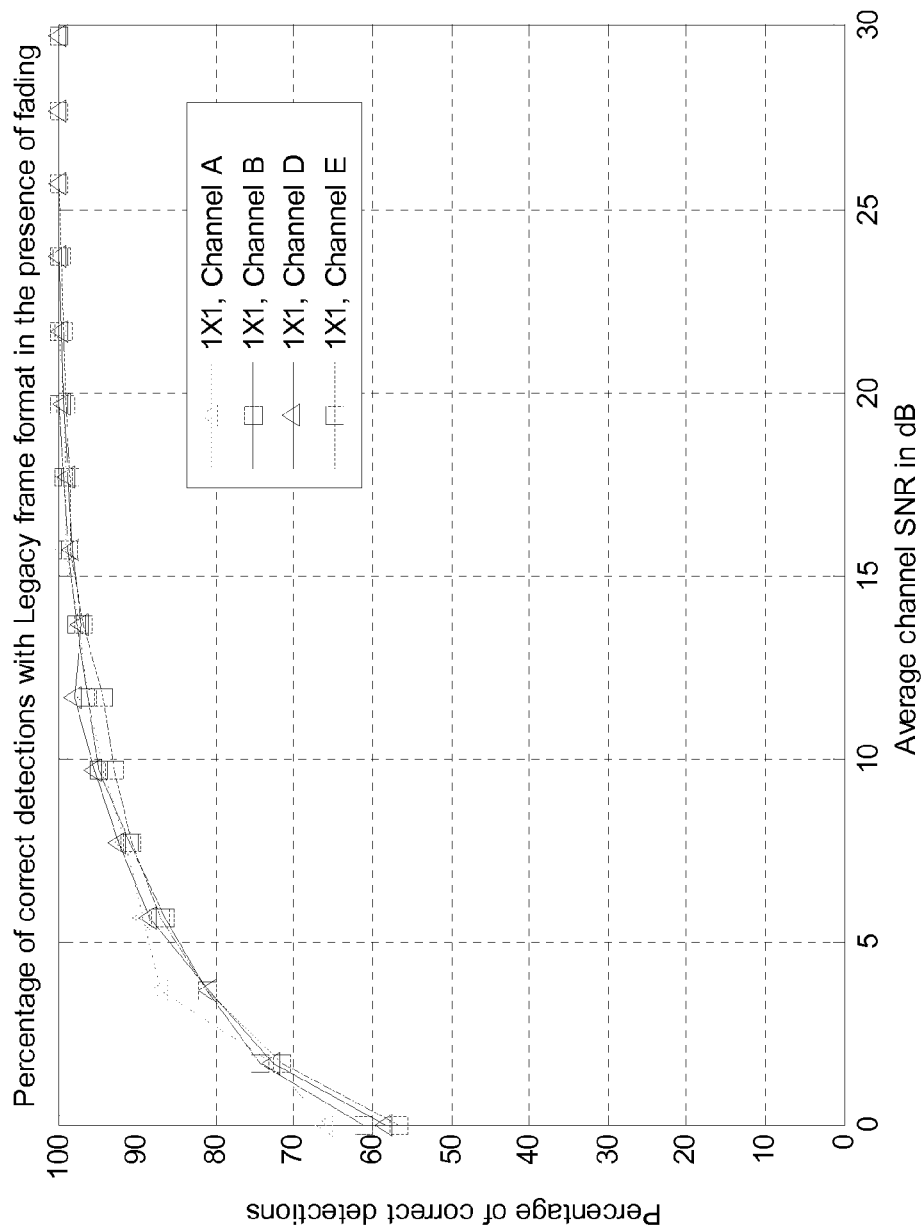
Figure 10:
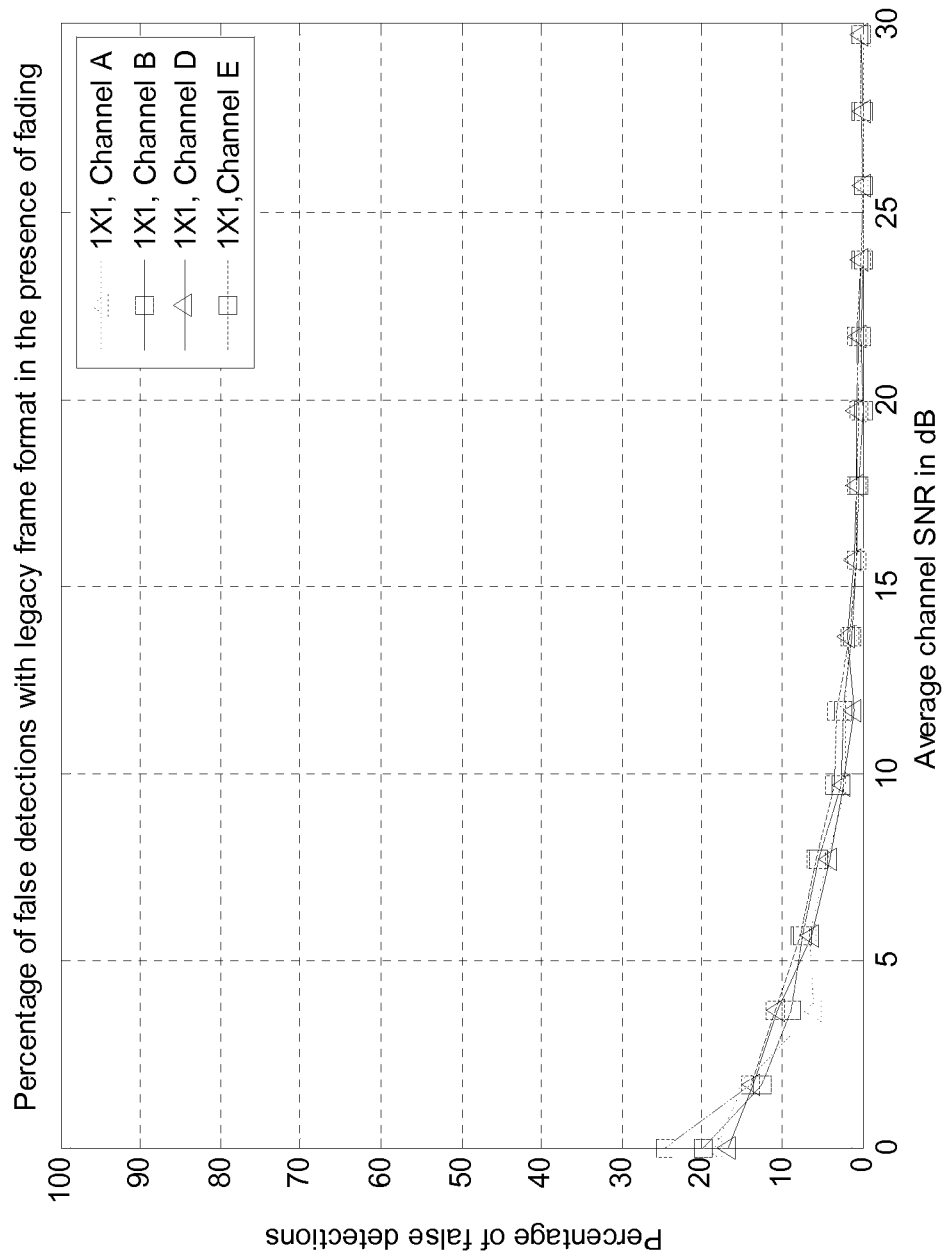
Figure 11:
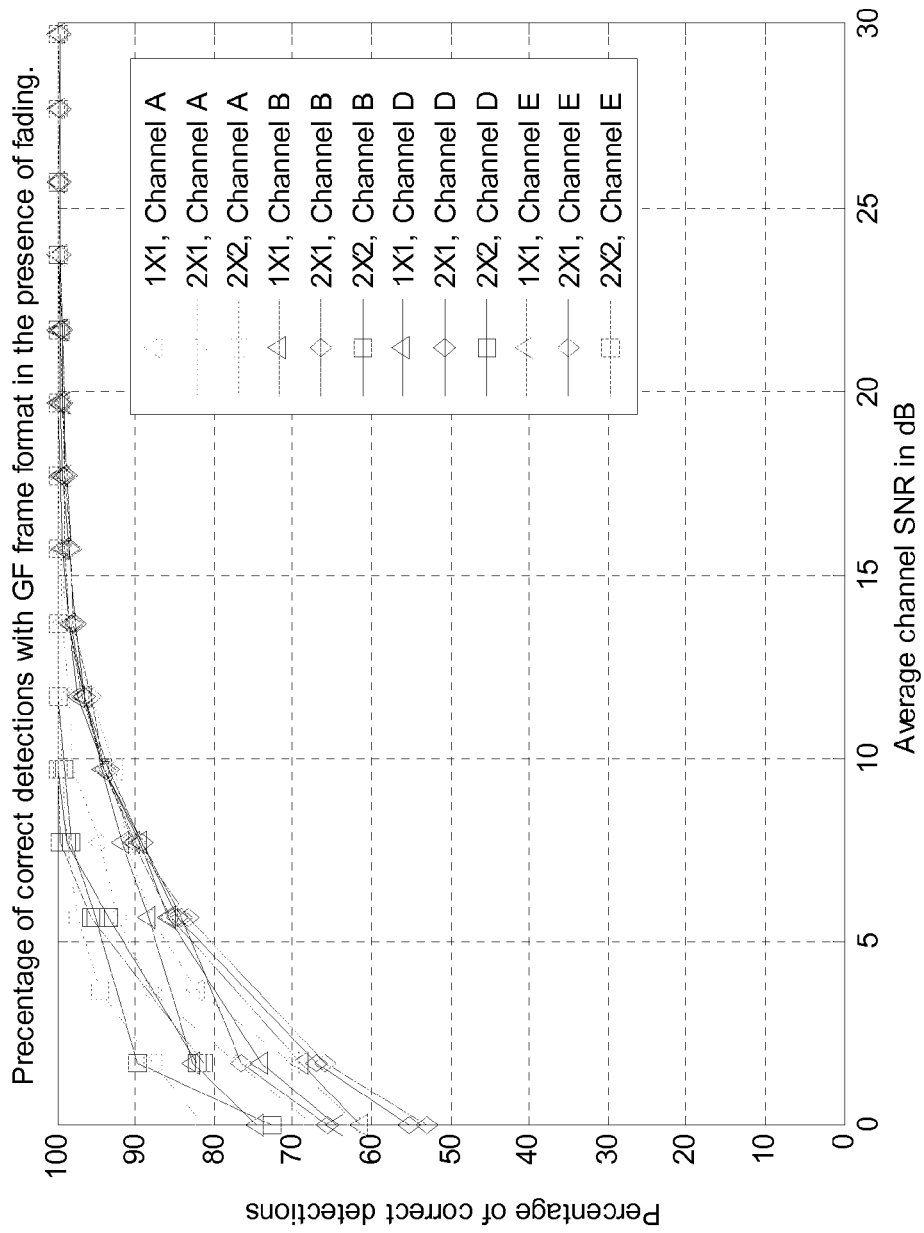
Figure 12:
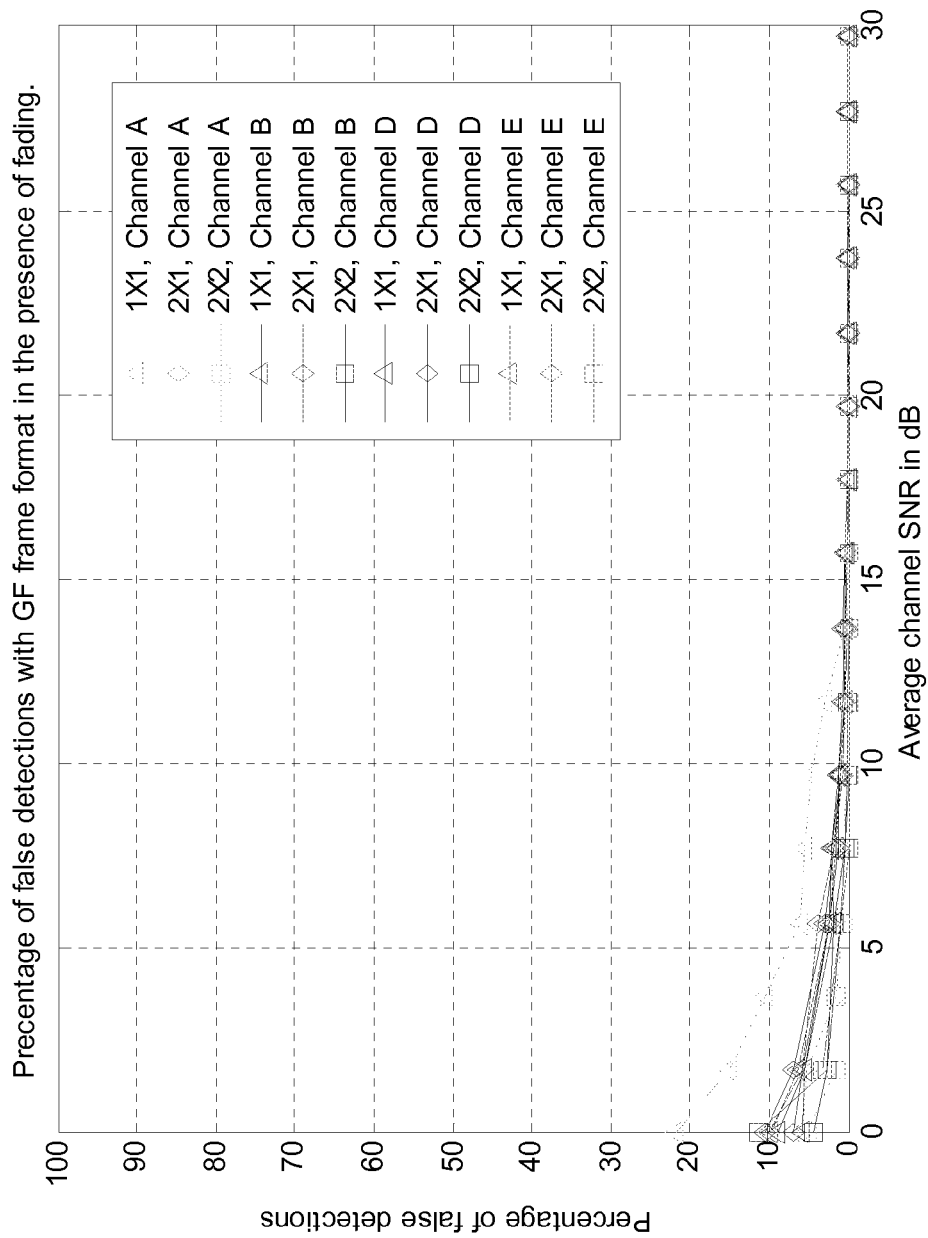
Figure 13:
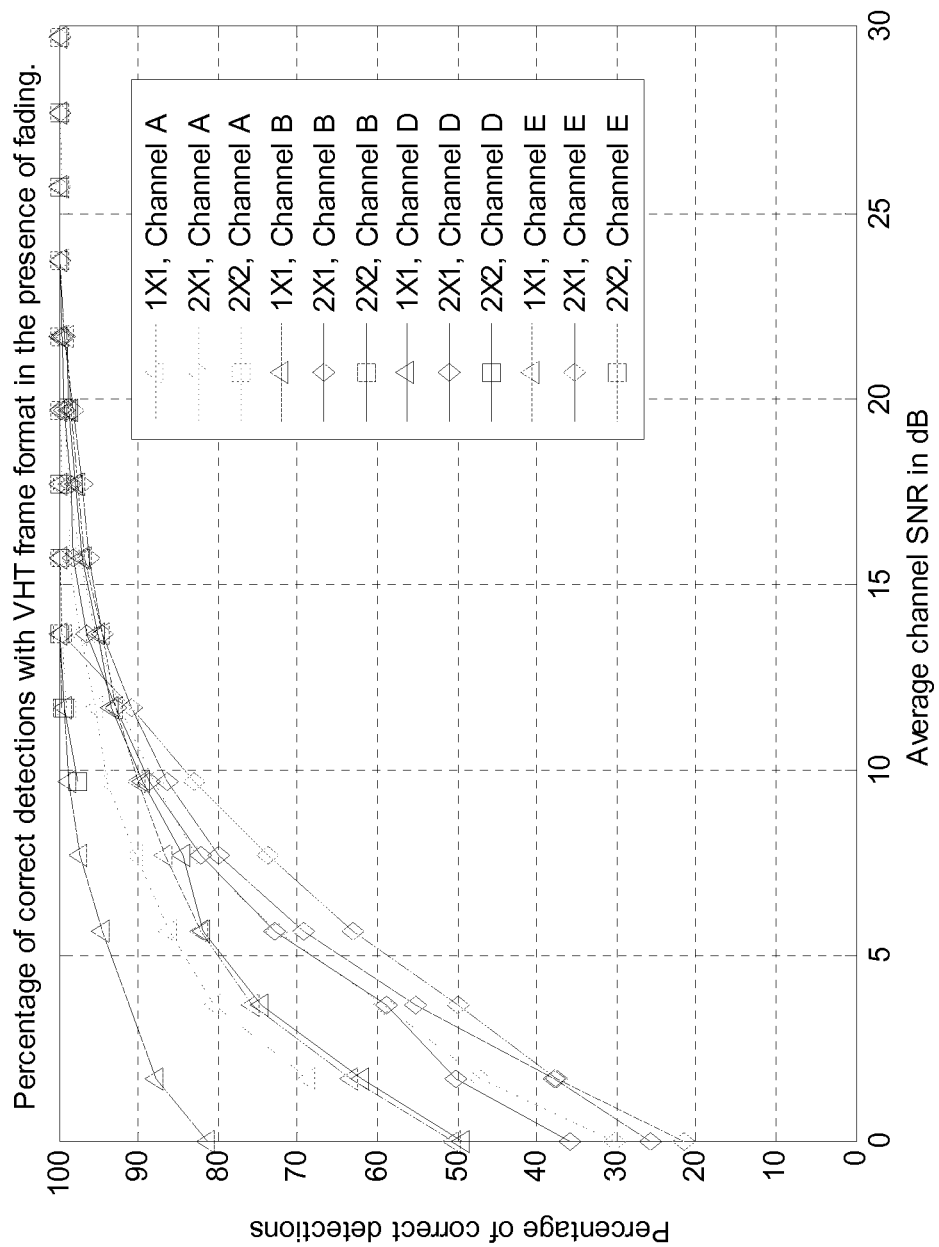
Figure 14:
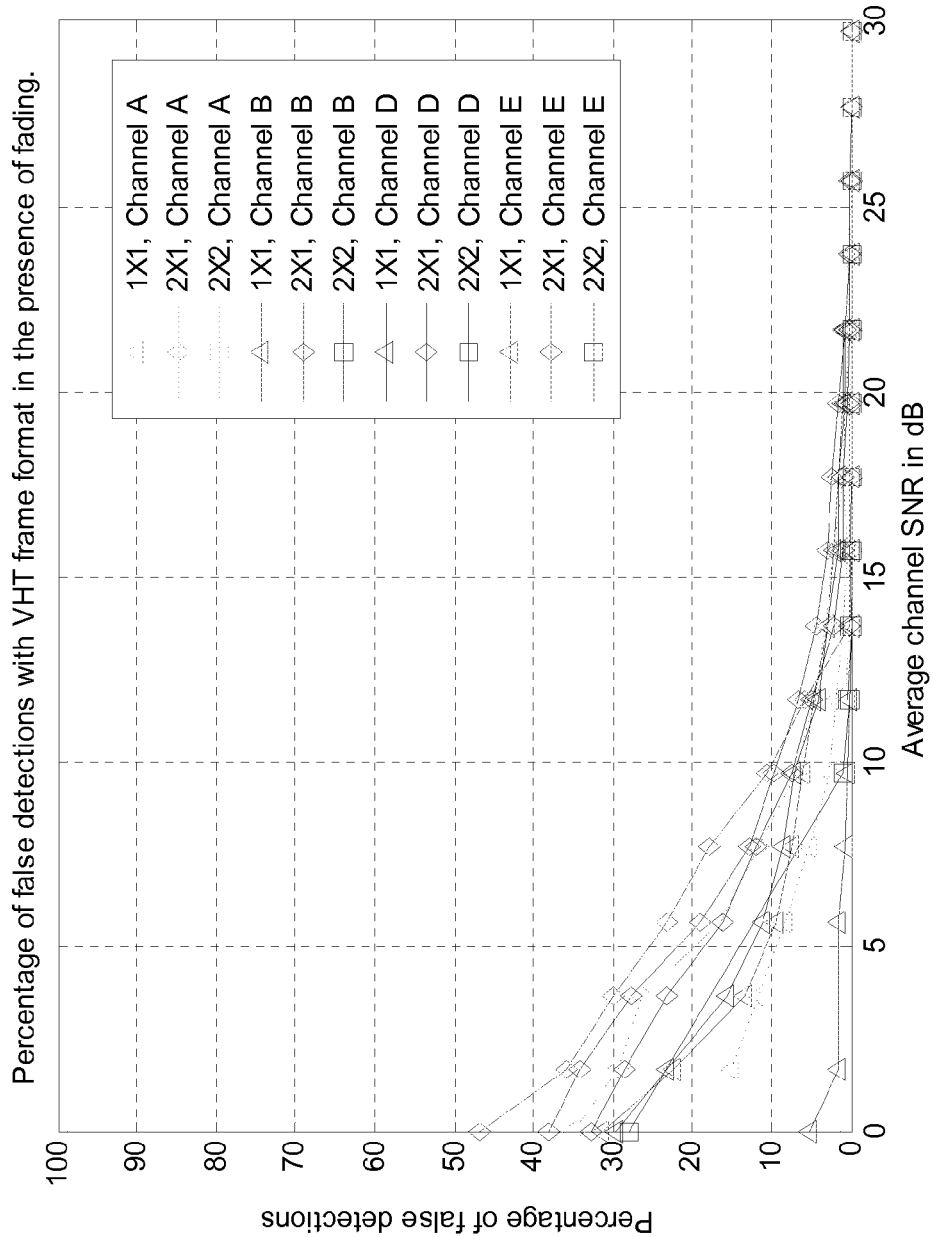
Figure 15:
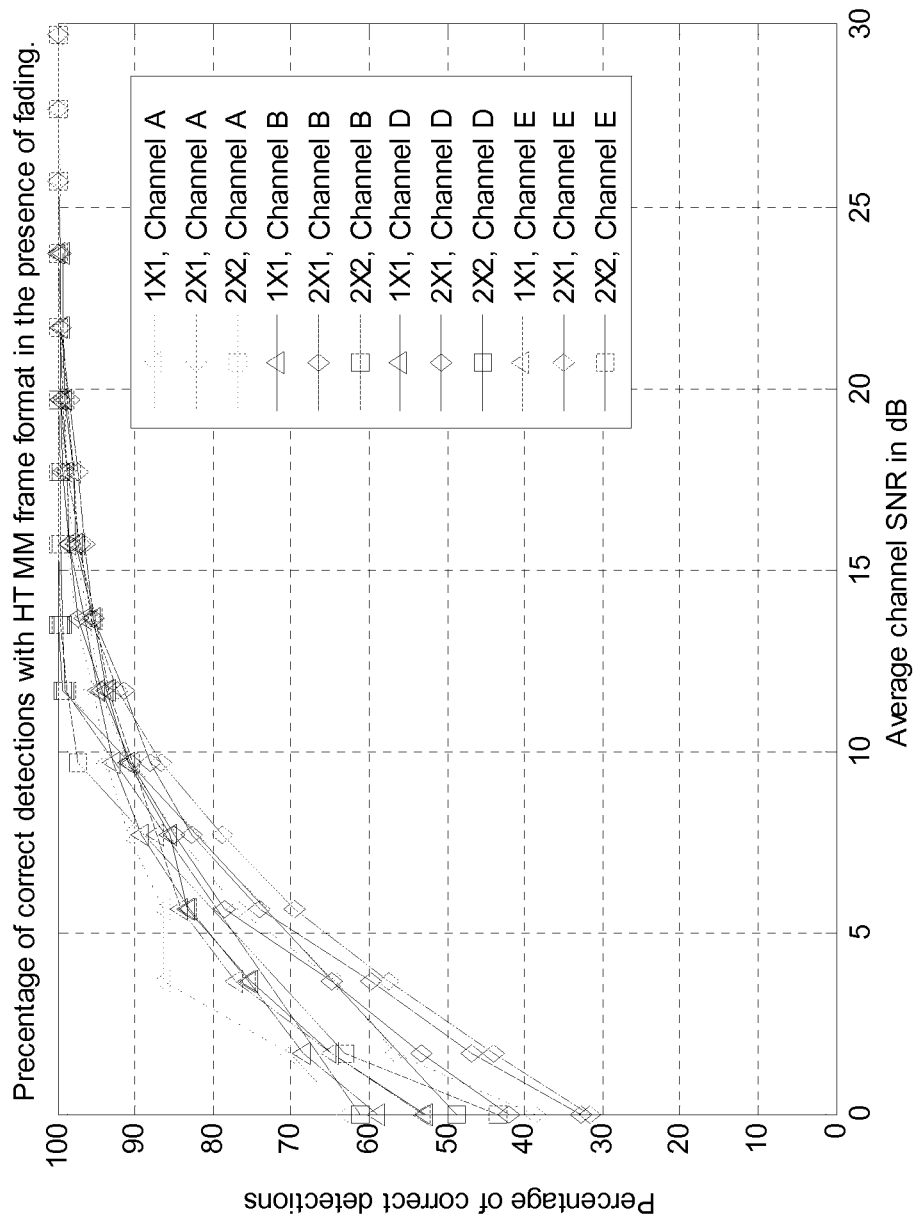
Figure 16:
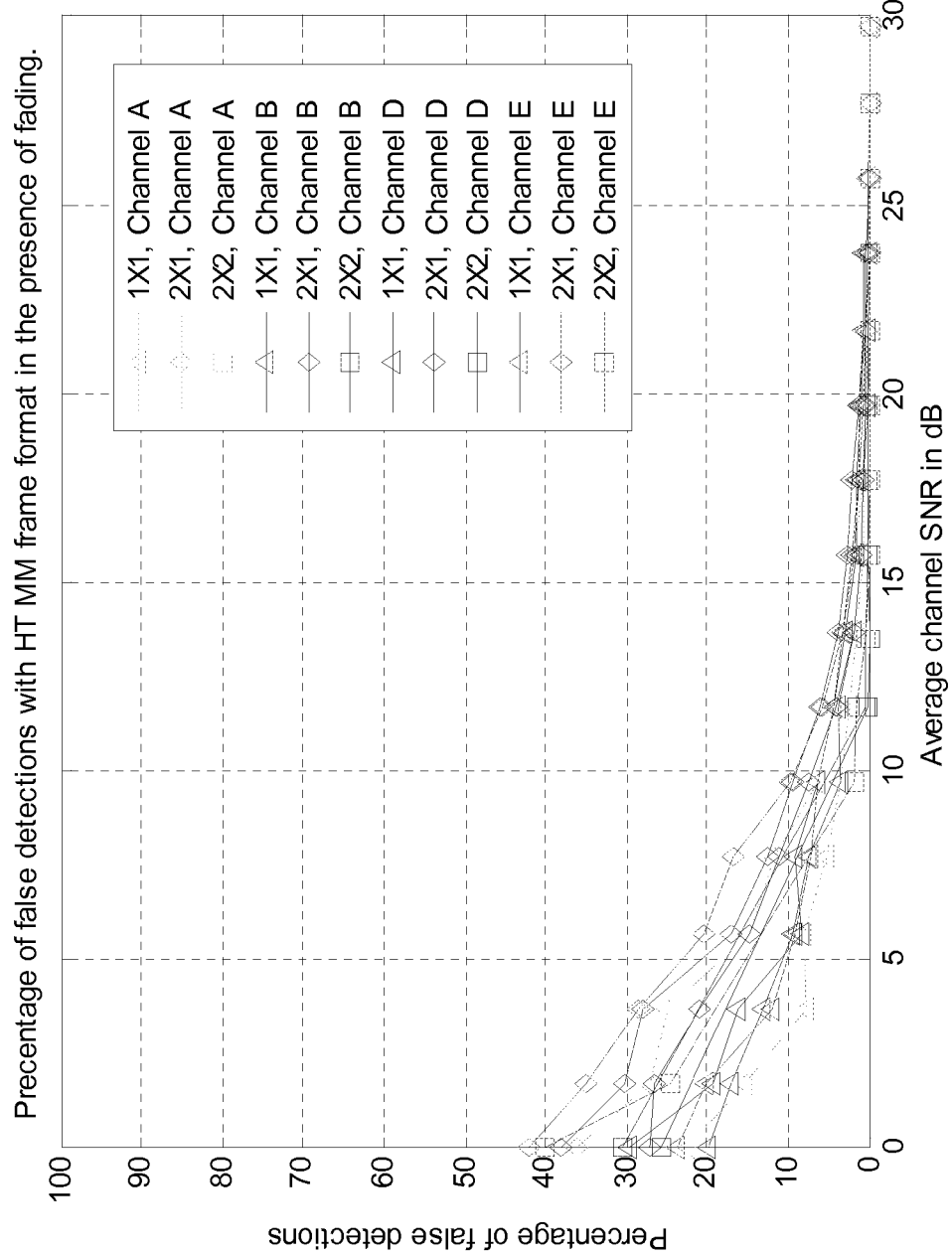

Furthermore, the simulation results of FIGS. 7 and 8 showed that the number of correction frame detections reached 100% at SNR above 5 dB when there is no fading. Also, the simulation results of FIGS. 11-16 showed that the number of correct frame detections reached to 100% at SNR of above 14 dB when there is fading without employing multiple receive antennas. Moreover, by exploiting the fading when there are multiple receiver antennas, the number of correct frame detections reached to 100% just above 7 dB SNR. As the operating SNR for HT and VHT frames are always above these numbers, the proposed method is very useful in real systems. As the performance of the proposed method is being improved with more number of receiver antennas, there is no limit on the number of antennas to be supported using the method and system described in FIGS. 1-6. It may be noted that the method described hereinabove also works well for all other bandwidth (BW) options such as 40, 80, and 160 MHz.

Thus, the method and systems described hereinabove aid in detecting the frame format in a wireless communication system. Also, the method and systems may detect the frame format even under degrading condition because, in addition to decoding bits of the frame, the modulation type and the position of symbols in the frame are considered for detecting the frame format.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for detecting a format of a frame in a communication system, the method comprising:
   receiving the frame comprising a plurality of orthogonal frequency division multiplexing (OFDM) symbols, wherein the plurality of OFDM symbols includes at least one signal field symbol, wherein the at least one signal field symbol comprises a plurality of sub-symbols having at least a real part and an imaginary part;
   determining a modulation associated with the at least one signal field symbol, wherein determining the modulation associated with the at least one signal field symbol further comprises:
      obtaining the real part and the imaginary part of each of the sub-symbols;
      computing absolute values associated with the real part of each of the sub-symbols;
      computing absolute values associated with the imaginary part of each of the sub-symbols;
      summing the absolute values associated with the real part of each of the sub-symbols;
      summing the absolute values associated with the imaginary part of each of the sub-symbols; and
      comparing the sum of the absolute values associated with the real part with the sum of the absolute values associated with the imaginary part to determine the modulation associated with the at least one signal field symbol, wherein the modulation includes one of a first modulation and a second modulation;
   estimating a position of the at least one signal field symbol among the plurality of symbols;
   extracting a coding rate of the received frame; and
   detecting the format of the received frame based on the determined modulation and the estimated position of the at least one signal field symbol, and the extracted coding rate of the received frame.

2. The method of claim 1, wherein comparing the sum of the absolute values further comprises:
   determining that the modulation associated with the at least one signal field symbol includes the first modulation when the sum of the absolute values associated with the real part is greater than the sum of the absolute values associated with the imaginary part; and
   determining that the modulation associated with the at least one signal field symbol includes the second modulation when the sum of the absolute values associated with the real part is lesser than the sum of the absolute values associated with the imaginary part.

3. The method of claim 1, wherein the coding rate of the received frame is extracted when:
   the determined modulation includes the first modulation; and
   the estimated position of the at least one signal field symbol is below a predefined position.

4. The method of claim 1, wherein the position of the at least one signal field symbol includes one of a first position, a second position, and a third position in the plurality of symbols.

5. The method of claim 4, wherein the format of the received frame includes one of a first format, a second format, a third format, and a fourth format.

6. The method of claim 5, wherein detecting the format of the received frame further comprises detecting the first format of the received frame when:
   the estimated position of the at least one signal field symbol includes the first position; and
   the determined modulation associated with the at least one signal field symbol includes the second modulation.

7. The method of claim 5, wherein detecting the format of the received frame further comprises detecting the second format of the received frame when:
   the estimated position of the at least one signal field symbol includes the second position; and
   the determined modulation associated with the at least one signal field symbol includes the second modulation.

8. The method of claim 5, wherein detecting the format of the received frame further comprises detecting the third format of the received frame when:
the estimated position of the at least one signal field symbol includes the third position; and
the determined modulation associated with the at least one signal field symbol includes the second modulation.

9. The method of claim 5, wherein detecting the format of the received frame further comprises detecting the fourth format of the received frame when:
the estimated position of the at least one signal field symbol includes the third position; and
the determined modulation associated with the at least one signal field symbol includes the first modulation.

10. The method of claim 5, wherein detecting the format of the received frame further comprises detecting the fourth format of the received frame when:
the estimated position of the at least one signal field symbol includes the first position;
the coding rate of the received frame is above a threshold coding rate; and
the determined modulation associated with the at least one signal field symbol includes the first modulation.

11. The method of claim 5, wherein detecting the format of the received frame comprises:
detecting the second format of the received frame when the first format of the received frame is undetected;
detecting the third format of the received frame when first format and the second format of the received frame are undetected; and
detecting the fourth format of the received frame when the first format, the second format and the third format of the received frame are undetected.

12. The method of claim 1, wherein extracting the coding rate of the received frame comprises:
determining that the at least one signal field symbol includes a first signal field symbol; and
decoding the first signal field symbol to extract the coding rate of the received frame.

13. The method of claim 1, wherein each of the plurality of OFDM symbols is received by multiple input multiple output (MIMO) antennas.

14. The method of claim 1, wherein each of the plurality of OFDM symbols is received by a single antenna.

15. An apparatus to detect a format of a frame, comprising:
a receiver configured to receive the frame comprising a plurality of orthogonal frequency division multiplexing (OFDM) symbols, wherein the plurality of OFDM symbols includes at least one signal field symbol, wherein the at least one signal field symbol comprises a plurality of sub-symbols having at least a real part and an imaginary part;
a scrutinizing unit communicatively coupled to the receiver, and configured to determine a modulation associated with the at least one signal field symbol, wherein the scrutinizing unit further comprises:
a processor configured to:
obtain the real part and the imaginary part of each of the sub-symbols;
compute absolute values associated with the real part of each of the sub-symbols; and
compute absolute values associated with the imaginary part of each of the sub-symbols;
an accumulator configured to:
sum the absolute values associated with the real part of each of the sub-symbols; and
sum the absolute values associated with the imaginary part of each of the sub-symbols; and
a comparator configured to compare the sum of the absolute values associated with the real part with the sum of the absolute values associated with the imaginary part to determine the modulation associated with the at least one signal field symbol, wherein the modulation includes one of a first modulation and a second modulation;
a counting unit communicatively coupled to the receiver, and configured to estimate a position of the at least one signal field symbol among the plurality of symbols;
a control unit configured to extract a coding rate of the received frame; and
a detecting unit configured to detect the format of the frame based on the determined modulation and the estimated position of the at least one signal field symbol, and the extracted coding rate of the received frame.

16. The apparatus of claim 15, wherein the comparator is configured to:
determine that the modulation associated with the at least one signal field symbol includes the first modulation when the sum of the absolute values associated with the real part is greater than the sum of the absolute values associated with the imaginary part; and
determine that the modulation associated with the at least one signal field symbol includes the second modulation when the sum of the absolute values associated with the real part is lesser than the sum of the absolute values associated with the imaginary part.

17. The apparatus of claim 15, wherein the position of the at least one signal field symbol includes one of a first position, a second position, and a third position in the plurality of symbols.

18. The apparatus of claim 17, wherein the format of the received frame includes one of a first format, a second format, a third format, and a fourth format.

19. The apparatus of claim 18, wherein the detecting unit is configured to:
detect the first format of the received frame when the estimated position of the at least one signal field symbol includes the first position, and the determined modulation associated with the at least one signal field symbol includes the second modulation;
detect the second format of the received frame when the estimated position of the at least one signal field symbol includes the second position, and the determined modulation associated with the at least one signal field symbol includes the second modulation; and
detect the third format of the received frame when the estimated position of the at least one signal field symbol includes the third position, and the determined modulation associated with the at least one signal field symbol includes the second modulation.

20. The apparatus of claim 18, wherein the detecting unit is configured to detect the fourth format of the received frame when at least one of:
the estimated position of the at least one signal field symbol includes the third position, and the determined modulation associated with the at least one signal field symbol includes the first modulation; and
the estimated position of the at least one signal field symbol includes the first position, the coding rate of the received frame is above a threshold coding rate, and the determined modulation associated with the at least one signal field symbol includes the first modulation.

21. A method for detecting a frame format in a communication system, the method comprising:
- receiving the frame comprising a plurality of orthogonal frequency division multiplexing (OFDM) symbols, wherein the plurality of OFDM symbols includes at least a first signal field symbol, a second signal field symbol, and a third signal field symbol;
- detecting that the frame is associated with a high through-put green-field format when the first signal field symbol is of a quadrature binary phase shift keying (Q-BPSK) modulation;
- detecting that the frame is associated with a legacy format when:
  - the first signal field symbol is of a binary phase shift keying (BPSK) modulation; and
  - a coding rate of the received frame is above a threshold coding rate;
- detecting that the frame is associated with a high through-put mixed mode format when:
  - the second signal field symbol is of the Q-BPSK modulation; and
  - at least the first signal field symbol is of the BPSK modulation; and
- detecting that the frame is associated with a very high through-put format when:
  - the third signal field symbol is of the Q-BPSK modulation; and
  - at least each of the first field symbol and the second field symbol is of the BPSK modulation.

22. The method of claim 21 further comprising detecting that the frame is associated with the legacy format when each of the first signal field symbol, the second signal field symbol, and the third signal field symbol is of the BPSK modulation.

* * * * *